US012414888B2

(12) United States Patent
Lin

(10) Patent No.: US 12,414,888 B2
(45) Date of Patent: Sep. 16, 2025

(54) CARING MACHINE, OVERHANGING MACHINE AND MAIN UNIT MODULE COMPRISED THEREIN

(71) Applicant: FULL CARE TECHNOLOGY CO., LTD., Taichung (TW)

(72) Inventor: Tsung-Yi Lin, Tainan (TW)

(73) Assignee: FULL CARE TECHNOLOGY CO., LTD., Taichung (TW)

( * ) Notice: Subject to any disclaimer, the term of this patent is extended or adjusted under 35 U.S.C. 154(b) by 0 days.

(21) Appl. No.: 18/697,449

(22) PCT Filed: Sep. 29, 2021

(86) PCT No.: PCT/CN2021/121951
§ 371 (c)(1),
(2) Date: Mar. 29, 2024

(87) PCT Pub. No.: WO2023/050227
PCT Pub. Date: Apr. 6, 2023

(65) Prior Publication Data

US 2024/0398644 A1 Dec. 5, 2024

(51) Int. Cl.
*A61G 7/10* (2006.01)

(52) U.S. Cl.
CPC ......... *A61G 7/1034* (2013.01); *A61G 7/1019* (2013.01); *A61G 7/1059* (2013.01)

(58) Field of Classification Search
CPC .. A61G 7/1034; A61G 7/1019; A61G 7/1059; A61G 7/1015; A61G 5/0875;
(Continued)

(56) References Cited

U.S. PATENT DOCUMENTS 3,889,964 A * 6/1975 Pitts, Jr. ............... A61G 5/1013 248/407
6,430,761 B1 * 8/2002 Brandorff ............. A61G 7/053 5/81.1 R (Continued)

FOREIGN PATENT DOCUMENTS

CN 102100623 A 6/2011
CN 204840050 U 12/2015

(Continued)

*Primary Examiner* — Justin C Mikowski
*Assistant Examiner* — Alison N Labarge
(74) *Attorney, Agent, or Firm* — Cheng-Ju Chiang

(57) ABSTRACT

The present invention provides a caring machine and an overhanging machine. A main unit module which included in the caring machine comprises a shifting module, a supporting frame module, and a coupling module. The shifting module, situated below the supporting frame module, allows for movement controlled by the opening and closing of wheel casters. The supporting frame module accommodates diverse caring modules, offering a range of care functions. The coupling module, positioned on the shifting module and the supporting frame module, comprises a plurality of coupling devices and a plurality of coupling interfaces. The caring machine integrating the main unit module is capable of addressing daily life activities and basic rehabilitation training for disabilities and elders. The overhanging machine, which using the caring machine, comprises support columns, overhanging arms, a receiving frame and a sling machine. This invention provides versatility and allows users to achieve plural functionalities within one machine.

12 Claims, 19 Drawing Sheets

(58) Field of Classification Search
CPC ................ A61G 5/1013; A61G 5/1059; A61H 2003/043; A61H 3/04; A61H 2201/0192
See application file for complete search history.

(56) References Cited

U.S. PATENT DOCUMENTS

| | | | | |
|---|---|---|---|---|
| 6,793,232 | B1 * | 9/2004 | Wing | A61G 7/1067 5/604 |
| 2011/0138532 | A1 * | 6/2011 | Lin | A61G 7/1059 5/86.1 |
| 2012/0174314 | A1 * | 7/2012 | Clement | A61G 7/1051 5/81.1 R |
| 2014/0068854 | A1 * | 3/2014 | Konishi | A61G 7/1019 5/87.1 |
| 2014/0265232 | A1 * | 9/2014 | Lin | A61G 7/1059 280/287 |
| 2015/0051519 | A1 * | 2/2015 | Morbi | A61G 7/1048 601/26 |
| 2015/0231017 | A1 | 8/2015 | Kazemi Banyhashemi | |
| 2015/0290058 | A1 * | 10/2015 | Panzer | A61G 3/063 403/109.6 |
| 2016/0331610 | A1 | 11/2016 | Brown et al. | |
| 2018/0161220 | A1 * | 6/2018 | Hong | A61G 7/1046 |

FOREIGN PATENT DOCUMENTS

| | | | | | |
|---|---|---|---|---|---|
| CN | 205094871 | U | | 3/2016 | |
| CN | 106267773 | A | | 1/2017 | |
| CN | 208259894 | U | | 12/2018 | |
| CN | 210991600 | U | | 7/2020 | |
| CN | 211461087 | U | * | 9/2020 | |
| CN | 212090001 | U | | 12/2020 | |
| CN | 216676228 | U | | 6/2022 | |
| CN | 115054493 | A | * | 9/2022 | |
| KR | 10-2010-0121243 | A | | 11/2010 | |
| KR | 10-2011-0114233 | A | | 10/2011 | |
| TW | M 583752 | U | * | 9/2019 | A61G 5/00 |
| WO | 2008/096210 | A1 | | 8/2008 | |

* cited by examiner

CARING MACHINE, OVERHANGING MACHINE AND MAIN UNIT MODULE COMPRISED THEREIN

CROSS REFERENCE TO RELATED APPLICATIONS

The present invention is a 35 U.S.C. § 371 National Phase conversion of International (PCT) Patent Application No. PCT/CN2021/121951, filed on Sep. 29, 2021, the disclosure of which is incorporated by reference herein. The PCT International Patent Application was filed and published in Chinese.

FIELD OF THE INVENTION

The present invention pertains to a medical rehabilitation and health care assistive device, and in particular to a main unit module and an assistive device such as a caring machine and an overhanging machine that can be combined with the main unit module.

BACKGROUND OF THE INVENTION

The population of developed countries and some developing nations worldwide is rapidly aging, the healthcare industry has emerged as one with significant development potential in the future. According to the World Health Organization, the global market size of the elderly industry is projected to reach an output value of US$37.38 billion by 2025.

Aging is frequently associated with functional decline and disability. The nature and extent of daily care, medical rehabilitation, and health care for individuals with disabilities vary, contingent upon the specific type and degree of disability. To aid individuals with limited mobility, healthcare professionals commonly utilize assistive mobility tools, such as hospital beds, wheelchairs, walkers, and similar devices to facilitate movement for those with disabilities.

However, during the care, treatment, rehabilitation, and recovery processes for individuals with disabilities, diverse mobility and rehabilitation needs arise as body functions recover. As a result, each assistive mobility tool plays a specific role in the rehabilitation journey of the disabled. While these tools offer valuable assistance, their usage opportunities are often limited, and they are frequently discontinued after a period due to the improving physical functions of the disabled. Simultaneously, both the disabled individuals and their caregivers often find themselves needing to acquire assistive mobility tools with varying functions. This not only adds financial burden on the disabled, their families, and caregiving institutions but also introduces inconvenience into the realms of medical care and nursing.

For the elderly, infirm, and disabled individuals, caring modules play a crucial role in facilitating quick completion of moving and transfer tasks in daily life. Utilizing caring modules not only enhances nursing staff efficiency but also reduces the risk of waist and back injuries that may arise during caregiving. Besides, for the elderly, frail, and disabled, regular standing and walking training are essential. Effective training not only diminishes the risk of limb muscle atrophy but also improves walking ability, contributing to the rehabilitation of lower limbs.

While the caring modules currently available in the market can generally fulfill the shifting module requirements of the elderly, infirm, and disabled individuals, their functionalities are often limited to specific tasks and may not meet the users' daily limb training needs, such as walking or squatting to maintain muscle strength and overall health. Additionally, these caring modules may prove inconvenient when engaged in other fundamental life activities, such as cleaning or using the toilet.

Therefore, it is crucial to develop a multi-purposed caring machine capable of addressing the daily life activities and basic rehabilitation training needs of individuals with disabilities. Integrating this caring module with a multi-modal caring module has become a challenge that experts in the field are actively seeking to resolve. Such a caring module should be adaptable for carrying the load-bearing module of the disabled or rehabilitated, and it should help users at different levels for various rehabilitation exercises. This facilitates a smooth transition for both the disabled and caregivers, from the initial stages of illness to the recovery process. This approach not only benefits a wide range of people by enhancing usability and functionality but also alleviates the economic burden on users and minimizes environmental resource wastage.

SUMMARY OF THE INVENTION

The object of the present invention is to provide a main unit module, a caring machine, and an overhanging machine equipped with the main unit module. The main unit module is adjustable and can accommodate various caring modules to deliver diverse care functionalities. These caring modules can be positioned at different heights on the main unit module based on specific usage needs. The caring machine comprises the main unit module and various caring modules, allowing users to engage in activities such as riding, shifting, and exercising. The overhanging machine consists of, at least, the main unit module and a shelf module, enabling users to execute suspension movements, rehabilitation exercises, the like.

In order to achieve at least one of the aforementioned or other advantages, one embodiment of the present invention provides a main unit module capable of integrating various caring modules to offer a range of caring functions, including operational features like shifting. The main unit module may comprise a shifting module, a supporting frame module, and a coupling module. The shifting module comprises at least one chassis unit and an auxiliary wheel caster set. The chassis unit includes a flat upper surface suitable for attaching, carrying other components, or serving as a pedal. The auxiliary wheel caster set is pivotally connected to two opposite sides of the chassis unit, allowing for opening and closing to facilitate the movement of the main unit module. The supporting frame module consists of multiple upright poles and connecting plates. One end of each upright pole is attached and secured to the chassis unit, while the other end is connected to the connecting plates and fixed beneath them. The coupling module comprises multiple coupling devices and coupling interfaces positioned on the supporting frame module. The coupling module can be utilized independently or in combination with the supporting frame module to attach and secure caring modules with diverse functionalities.

A plurality of first keyholes are arranged along the vertical direction on the outer side of the upright pole to attach caring modules with various functions or a series of coupling modules. The connecting plate provides multiple first mounting holes, multiple second keyholes, and numerous fasteners. Once one end of the upright pole is connected to the first mounting hole, it is secured beneath the connecting plate through the second keyhole the fastener. It can be inferred that the multiple upright poles are employed to affix and stabilize multiple connecting plates above the chassis unit. This allows the main unit module to accommodate caring modules or other components with diverse functionalities by utilizing the multitude of upright poles and connecting plates.

To explain further, the coupling interface of the coupling module may consist of, but is not restricted to, the first keyholes, the first mounting holes, the second keyholes. The coupling device is slidably enclosed on the upright pole and secured onto it through the first keyholes. Caring modules provided with various functions can be attached and secured on the upright poles using the first keyholes and coupling devices, the caring modules are positioned on one side of the supporting frame module.

The main unit module may comprise a support rod horizontally positioned and supported on multiple connecting plates. When the user stands on the chassis unit of the shifting module, the support rod can be utilized to provide additional support for the user.

The main unit module may also include a support rod horizontally supported on multiple connecting plates. The support rod is provided with multiple braking handgrips for managing the movement of the main unit module. The braking handgrips may be integrally formed with the support rod. Alternatively, they may be individually molded and subsequently enclosed and secured onto the support rod. In this configuration, the support rod can function as a shifting module.

In order to achieve at least one of the above-mentioned advantages or other advantages, one embodiment of the present invention provides a caring machine that can be equipped with caring modules with different functions. The caring machine comprises at least the aforementioned main unit module and a shifting module. The shifting module is installed on the main unit module and can control the operational process of the caring machine. The shifting module may include a mounting bracket, an armrest, and a plurality of braking handgrips. The mounting bracket is installed above the connecting plate of the supporting frame module through the first mounting holes. The armrest is generally U-shaped and is attached and fixed to one side of the mounting bracket, providing support for users or caregivers to hold onto. A plurality of braking handgrips are sleeved and fixed on the armrest, facing the mounting bracket, and are used to control the movement of the caring machine.

In some embodiments, the caring machine may comprise a carrying module installed on the main unit module. The carrying module includes, at least, a plurality of attachment bases, two guardrails, and two load-bearing plates. The attachment bases are sleeve-mounted on the supporting frame module of the main unit module. Specifically, the attachment bases can be secured onto the upright poles of the supporting frame module through the first keyholes. The two guardrails are respectively pivotally connected to the attachment bases, allowing rotation in the horizontal direction around the attachment bases. The two guardrails can be expanded outward, to the left, to the right, or closed inward.

The two load-bearing plates are detachably and rotatably installed at the bottom or below of the two guardrails, respectively. When the load-bearing plates are positioned horizontally, they can be used to carry weight, such as when users ride on them. When the load-bearing plates are shifting upward, they can be brought close to the guardrails and fixed onto them. In this configuration, the carrying module can be utilized as a support for the user.

The carrying module can also include a backrest assembly that can be connected and locked with the two guardrails. When the two load-bearing plates are positioned horizontally, the user sits on them, the backrest assembly can provide support and protection for the user's back.

Each of the guardrails includes two long poles. The two long poles are arranged vertically in parallel and connected and secured by several connecting rods with a specific spacing. Pivot-mounted locking devices are installed and locked at both ends of the long poles. One end of each long rod is pivotally connected and fixed to the attachment base, the other end is connected and fixed to the backrest assembly.

The load-bearing plate is rotatably provided at the bottom of the guardrails through multiple limit pins on the rotating rod. When the load-bearing plate is lifted upward, it is brought close to the guardrail. When the load-bearing plate is placed horizontally, it can carry the load. Each load-bearing plate has an arc-shaped notch. When the two load-bearing plates are laid flat and closed, the two arc-shaped notches face each other, forming an opening. Thus, users can ride on the two load-bearing plates.

In some embodiments, the caring machine may include a top support module mounted on the supporting frame module of the main unit module. More precisely, the caring machine can be secured on the upright poles of the supporting frame module through the first keyholes. The top support module is designed with an adjustment function, allowing its position to be modified upwards, downwards, forwards, or backwards based on the usage conditions.

The top support module may comprise an attachment bracket and a seatback cushion. The attachment bracket is affixed to the upright poles of the supporting frame module through the first keyholes, the seatback cushion is mounted on the attachment bracket, facing the user and providing support for the user's knees and other body parts.

In certain embodiments, the caring machine may include a support module, designed to be mounted on the main unit module, providing support and safeguarding for the user while standing on the caring machine. The support module is affixed to the supporting frame module of the main unit module and comprises a pair of receiving rods, two supporting devices, and two braking handles. Each receiving rod is equipped with multiple mounting pins and is horizontally affixed to the connecting plate through the first mounting holes the mounting pins. The two supporting devices are respectively mounted on the two receiving rods, and each of the supporting devices consists of an attachment bracket set, a support member, and a support pad. The attachment bracket set is securely encased on the receiving rod, while the support member and support pad are flexibly attached to the attachment bracket set. The support member provides horizontal adjustment, allowing alteration of the distance between the support member the attachment bracket set. Meanwhile, the support pad possesses a 360-degree rotational capability within a horizontal plane, enabling the adjustment of its fixed angle position relative to the attachment bracket set. The braking handles are respectively fixed onto the attachment bracket set and serve the purpose of maneuvering the caring machine.

The attachment bracket set of each of the supporting devices comprises a sleeve member, a mounting bracket, a mounting plate, and a plurality of locking members. The sleeve member is slidably encased and secured on the receiving rod, serving as a receptacle for installing the mounting bracket. The mounting bracket is flexibly mounted within the sleeve member, enabling perpendicular alignment with the receiving rod. The installation height of the mounting bracket can be adjusted vertically relative to the receiving rod. Once installed and secured, the mounting plate is positioned on the mounting bracket along a horizontal plane to accommodate the support pad. Within this horizontal plane, the support pad has a 360-degree rotational capability for adjusting its fixed angle position. The mounting bracket is provided with multiple locking members that can interconnect and fix with the braking handles.

The support module may comprise a supporting assembly, which consists of multiple adjustable rods arranged in a generally U-shaped configuration. The two ends of the supporting assembly are respectively installed on two attachment bracket sets, and are positioned above the supporting devices.

The mounting bracket is generally T-shaped and comprises a horizontal rod and an upright rod. The mounting rods are installed at both ends of the horizontal rod, and these mounting rods can be adjustably connected and fixed to the adjustable rods of the supporting device. It allows the supporting assembly to be adjusted in height vertically and in width horizontally.

When the user stands on the chassis unit of the caring machine, the two supporting members of the supporting device can be utilized to support the user's waist, while the two support pads can be used to support the user's hands. In cases where the user's upper torso strength is insufficient, the supporting assembly can provide support to the user's chest and abdomen, preventing the user from tripping while standing. This enables users with disabilities to perform simple body movement exercises such as standing more stably on the caring machine.

In certain embodiments, the caring machine may include a primary wheel module installed on the main unit module. The primary wheel module, at times, is used to be the primary wheel of the caring machine, allowing it to be used both indoors and outdoors as needed. In specific situations, it can function as a wheelchair. The primary wheel module comprises at least two mounting brackets and two primary wheels. The two mounting brackets are symmetrically installed on the upright poles of the supporting frame module the wheel caster set of the shifting module. Each wheel caster set consists of a long leg and a short leg, with the mounting bracket installed on the long leg. Besides, the primary wheel module may include a first crossbar and two actuation mechanisms. Both ends of the first crossbar are connected and fixed to the two mounting brackets, enhancing the stability of the connection between them. The two actuation mechanisms are implemented on the rotating rod of the primary wheel and are linked with it. The two primary wheels are connected and locked into the primary wheel shaft hole devices of the mounting bracket through the primary wheel shaft.

The primary wheel module may also comprise a lifting device, symmetrically installed on the mounting bracket or the wheel caster set. By controlling the lifting device, the height of the wheel caster set connected to the mounting bracket can be adjusted. In other words, the height of the long leg in the wheel caster set can be modified through the lifting device, lifting the wheels installed at the long leg to a specific distance above the ground. Subsequently, the primary wheels are employed as the wheels for the long leg in the wheel caster set.

The lifting device comprises an overhead frame and a set of limiting pins. The lifting device is used to elevate the wheel caster set connected to it, making it easier to install or disassemble the primary wheel from the mounting bracket.

To achieve at least one of the aforementioned advantages or other benefits, an embodiment of the present invention provides an overhanging machine that comprises the aforementioned main unit module and a shelf module. The shelf module is installed and positioned above the main unit module, allowing users to engage in various exercise training, such as rehabilitation exercises. The shelf module includes multiple support columns and at least two overhanging arms. The support columns are vertically installed on the connecting plate through the first mounting holes, the two overhanging arms are mounted on the support columns, positioned above the connecting plate. One end of the overhanging arm may be equipped with a hook-shaped member for hanging objects.

In certain embodiments, the shelf module may comprise a receiving frame positioned on the upper ends of multiple support columns to connect the two overhanging arms. The receiving frame comprises at least two long rods, at least two short rods, and multiple locking support members. The two long rods and two short rods are interconnected and secured through the locking support members, then horizontally positioned on the top or upper ends of the support columns.

The locking support member is equipped with a groove and is positioned on a side distanced from the support column. The two overhanging arms are encompassed within the groove and secured on the locking support member to establish a connection above the receiving frame. To elaborate, along vertical direction, one end of the locking support member is connected and secured with the upper end of the support column, while the other end passes through the groove to accommodate and support the overhanging arm. Meanwhile, along horizontal direction, two opposite sides of the locking support member are connected and secured with the long rod the short rod, respectively. Additionally, one side of the locking support member may incorporate a hook-shaped member for hanging objects.

In certain embodiments, the overhanging machine may also comprise a sling machine, positioned on the chassis unit of the shifting module, and including a retractable sling. The retractable sling can be suspended from the shelf module and employed for the purpose of suspending objects.

In specific embodiments, the overhanging machine may comprise a second crossbar that is horizontally supported on the two overhanging arms. When this second crossbar is securely attached to the two overhanging arms, it can serve as a horizontal bar for users to engage in stretching exercises. Furthermore, the position of installation and locking for the second crossbar on the two overhanging arms can be adjusted along the overhanging arms, both forward and backward. The second crossbar can also be suspended from the two overhanging arms using an elastic band. When the user holds the second crossbar, limb training can be performed through the telescopic movement facilitated by the retractable sling.

In a specific embodiment, a roller can be affixed to the second crossbar, serving as a means to hang objects. The retractable sling from the sling machine can be wound around the outer surface of the roller to suspend objects. The retractable sling may include a hook for improved object suspension.

In some embodiments, the overhanging machine may further include a pull rope assembly disposed on two overhanging arms. The pull rope assembly includes a plurality of hook members and a plurality of pull ropes. Multiple hook members are symmetrically locked on two overhanging arms, and multiple pull ropes are threaded through the hook members. One ends of the hook members are hooked to the head end of the retractable sling of the sling machine, the other ends of the hook members are used to suspend an object.

In some embodiments, the overhanging machine may further include a suspension cloth module suspended from the shelf module. In one embodiment, the suspension cloth module can be hung on two overhanging arms for the user to perform shifting or perform other exercises and training with the help of the overhanging machine. In another embodiment, the suspension cloth module can be suspended from the shelf module through a sling machine and a sling.

In certain embodiments, the caring machine may further comprise an electric module, securely fixed onto the chassis unit using fasteners and positioned on a plurality of second mounting holes. The electric module comprises a mounting bracket installed above the upper surface of the chassis unit through the second mounting holes. A column module is comprised of a fixed bracket and a lifting bracket, with the fixed bracket securely installed on the mounting bracket. The lifting bracket is positioned above the fixed bracket, and capable of vertical movement. Multiple apertures arranged vertically on the lifting bracket facilitate the installation of caring modules with different functions at adjustable heights. A driving module, mounted on the mounting bracket, is used to facilitate the vertical movement of the lifting bracket.

In certain embodiments, the aforementioned electric module may additionally comprise a plurality of fastening devices located on the column module. The fastening devices can be securely locked at various heights of the lifting bracket through the apertures. The fastening devices are provided with multiple fastening interfaces designed for the installation of caring modules.

The present invention provides a versatile main unit module designed to accommodate various care modules at adjustable heights, facilitating user customization and enhancing mobility. The overhanging machine allows users to be suspended and shifted, aiding in limb movement and contributing to the rehabilitation of individuals with mobility challenges. Furthermore, the caring machine offers a diverse range of care functions for users, including those with disabilities. The modular design allows for easy customization based on specific user needs, eliminating the need for frequent replacements and ultimately reducing overall healthcare costs.

The aforementioned illustrations are exemplary for the purpose of further explaining the scope of the present invention. Other objectives and advantages related to the present invention will be illustrated in the subsequent descriptions and appended drawings. [0001]

DESCRIPTION OF THE DRAWINGS

The foregoing features of the present invention may be combined with the following drawings in various combinations without exclusivity, unless expressly indicated otherwise. Apparently, descriptions of drawings in the following may be some of embodiments of the present invention, those of ordinary skill in the art may derive other drawings based on the following drawings without unduly experiments.

NOTATIONS IN DRAWINGS

Figure 1:
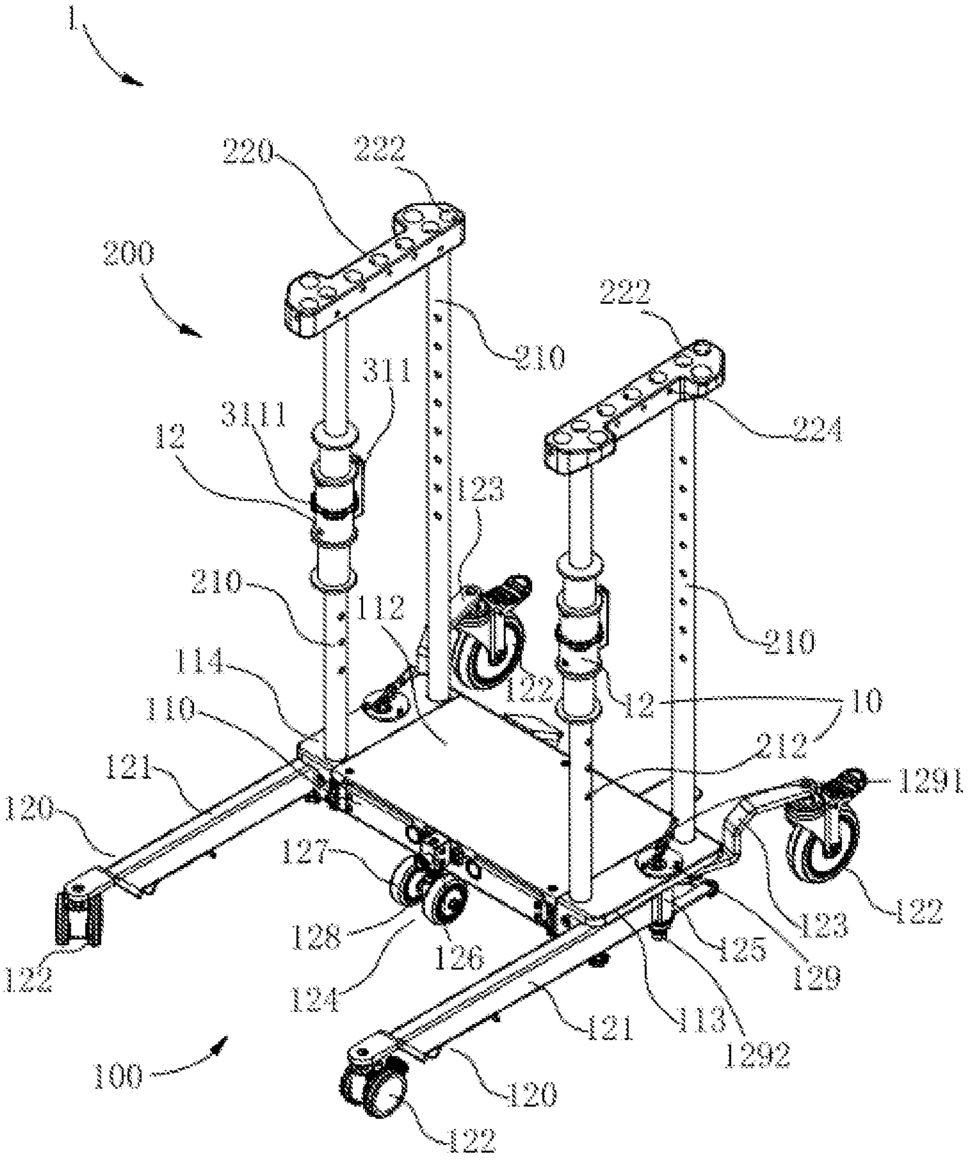
FIG. 1 is a perspective view of an embodiment of a main unit module of the present invention.

1—main unit module, 2—caring machine, 3—push module, 4—overhanging machine, 100—shifting module, 10—coupling module, 110—chassis unit, 112—flat upper surface, 113—mounting locking plate, 114—receiving surface, 115—second mounting hole, 12—coupling device, 120—wheel caster set, 121—long leg, 122—universal wheel caster set, 123—short leg, 124—directional wheel caster set, 125—pivot shaft, 126—switching device, 127—directional wheel, 128—elastic device, 129—braking device, 1291—operating rod, 1292—activation rod, 130—support rod, 140—support rod, 142—handle, 144—braking handgrip, 150—chassis body, 151—guide unit, 152—guide unit, 154—locking member, 160—T-shaped sliding body, 161—straight bar, 162—crossbar, 170—moving pedal, 171—pedal, 20—support module, 200—supporting frame module, 202—attachment pin, 210—upright pole, 212—first keyhole, 22—receiving rod, 220—connecting plate, 222—first mounting hole, 224—second keyhole, 226—fastener, 24—supporting device, 242—mounting bracket set, 2422—sleeve member, 2424—mounting bracket, 2425—horizontal rod, 2426—attachment plate, 2427—upright rod, 2428—fastener, 2429—mounting rod, 244—support member, 246—support pad, 26—braking handgrip handle, 28—supporting device, 280—adjustable rod, 281—straight adjustable rod, 300—carrying module, 310—attachment base, 311—height adjustment device, 3110—positioning pin, 3111—switch operating member, 32—mounting bracket, 320—guardrail, 321—pivot device, 3210—pivot hole, 322—long rod, 323—long rod, 323—rotating rod,

326—pivot locking device, 3261—pivot sleeve, 3262—positioning groove, 328—self-locking positioning device, 3281—positioning hole, 3282—positioning pin, 3283—release button, 330—backrest assembly, 332—backrest seat, 334—backrest, 336—hook locking member, 337—fastener, 338—backrest mounting base frame, 34—handrail, 340—load-bearing plate, 342—arc-shaped notch, 344—opening, 345—limiting pin, 346—pivot groove, 347—elongated hole, 348—positioning pin, 36—braking handgrip, 38—safety hook, 500—top support module, 501—attachment bracket, 502—seatback cushion, 600—primary wheel module, 610—mounting bracket, 612—locking device, 615—rotating rod, 616—primary wheel rotating hole device, 620—first crossbar, 630—braking mechanism, 640—primary wheel, 650—lifting device, 651—elevated frame, 652—limiting pin, 660—electric driving wheel, 700—shelf module, 710—support column, 711—connecting rod, 720—overhanging arm, 730—receiving frame, 732—long rod, 733—handgrip rod, 734—short rod, 736—locking support member, 7361—hook-shaped member, 738—groove, 740—second crossbar, 741—locking component, 742—roller, 750—sling machine, 752—retractable sling, 7521—hook, 754—pull rope assembly, 7541—hook member, 7542—pull rope, 760—hanging cloth module, 800—electric module, 810—mounting base frame, 811—coupling base, 8111—positioning rod, 8112—fastener, 812—adapter base, 820—column module, 821—fixed bracket, 822—lifting bracket, 830—driving module, 840—fastening device, 841—fastening interface, 901—health care module, 902—health care module

DETAILED DESCRIPTION OF THE PREFERRED

Embodiments

The structures and associated functions and following detailed descriptions are exemplary for the purpose of further explaining the scope of the present invention. Other objectives and advantages related to the present invention will be illustrated in the subsequent descriptions and appended drawings. Furthermore, the present invention may be embodied in various modifications, and descriptions and illustrations are not-limiting.

It should be understood that the term used herein in embodiments to describe direction in terms of “central”, “lateral”, “up”, “down”, “right”, “left”, “upright”, “horizontal”, “top”, “bottom”, “inside”, and “outside” are used to illustrate the present invention and for clarity. It does not hint or imply that device or part mentioned should be assembled or operated in specific direction or setting. Thus, the terms used herein to describe direction are not limiting. In addition, terms “first”, and “second” is for descriptive purpose, and is not construed to or implies amount as described in technical feature of the present invention. Technical features with limitation terms “first” or “second” would illustrate or imply that one or more technical features can be included. As to detailed description of the present invention, the term “more” indicates two or more unless expressly indicated otherwise.

Figure 2:
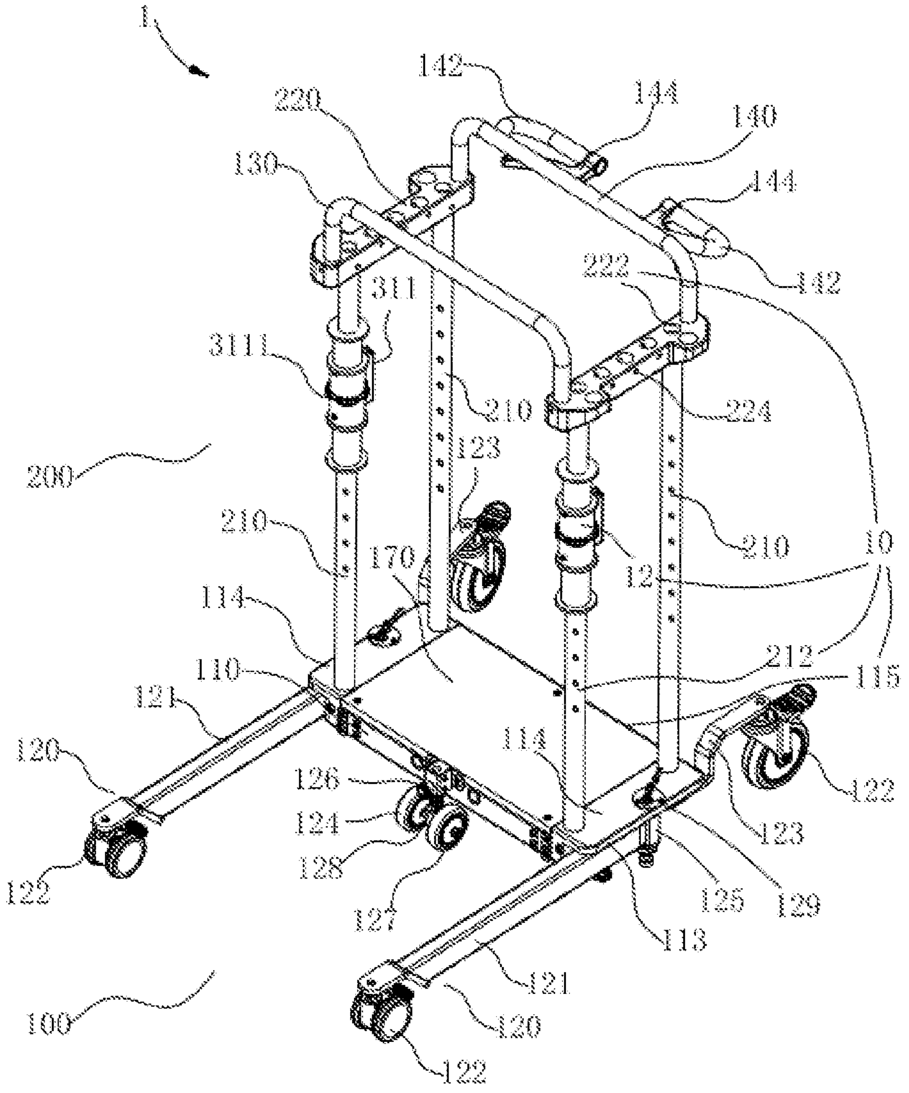
FIG. 2 is a perspective view of another embodiment of the main unit module according to the present invention.
Figure 3:
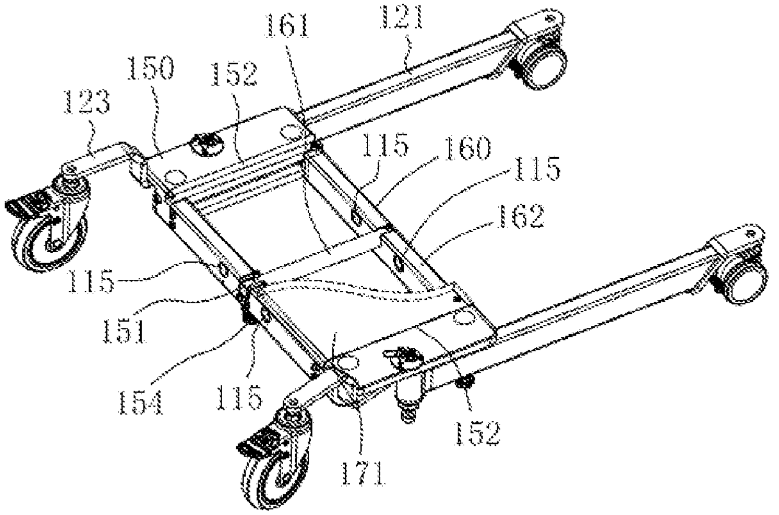
FIG. 3 is a partial cross-sectional view of the pedal in FIG. 2.

Please refer to FIGS. 1, 2, and 3. FIG. 1 illustrates a perspective view of a main unit module according to one embodiment of the present invention. FIG. 2 displays a perspective view of the main unit module according to another embodiment of the present invention. FIG. 3 provides a partial cross-sectional view of the pedal as shown in FIG. 2. To achieve at least one of the aforementioned advantages or other benefits, an embodiment of the present invention provides a main unit module 1 capable of being combined with various caring modules to offer diverse care functions and perform actions such as shifting and moving.

As depicted in FIGS. 1 and 3, the main unit module 1 comprises a shifting module 100, a supporting frame module 200, and a coupling module 10. The shifting module 100 includes at least a chassis unit 110 and a wheel caster set 120. The chassis unit 110 is positioned horizontally, the wheel caster sets 120 are pivotally connected to two opposite sides of the chassis unit 110. The wheel caster sets 120 can open and close, driving the main unit module 1 to move. The chassis unit 110 is equipped with a flat upper surface 112 that can function as a pedal. In FIG. 3, the chassis unit 110 consists of a chassis body 150 and a moving pedal 170. The chassis body 150, forming a U-shaped structure, is used to accommodate the wheel caster set 120 the supporting frame module 200 while guiding the movement of the moving pedal 170. The moving pedal 170 comprises a T-shaped sliding body 160 and a pedal 171. The T-shaped sliding body 160 is composed of a straight bar 161 and a crossbar 162 perpendicular to each other. In this embodiment, the upper surface of the pedal 171 corresponds to the flat upper surface 112 of the chassis unit 110, but the present invention is not limited to this configuration. In the embodiment shown in FIG. 3, one end of the straight bar 161 is securely fitted into the groove in the center of the crossbar 162, forming a T-shaped structure that matches the chassis body 150. Together, they define the bottom frame of the chassis unit 110, which accommodates the pedal 171. The U-shaped structure of the chassis body 150 provides guide units 151/152 in the center and on two opposite sides, respectively. The guide unit 151 in the center of the U-shaped structure is designed to slidably receive the straight bar 161 of the T-shaped sliding body 160. The guide units 152 are intended to slidably receive both ends of the crossbar 162. The pedal 171 is positioned above the T-shaped sliding body 160, so that the pedal 171 can slide forward and backward on the guide unit 151/152 of the chassis body 150, moving between different positions. The guide unit 151 is equipped with a locking member 154, securing the straight rod 161 to fix the moving pedal 170 in various positions. The pedal 171 can meet multiple demands, such as acting as a pedal for the user to rest their feet or as a mounting surface for attaching and installing other modules and components. The form of the guide unit 151/152 may vary and is not restricted to a groove or rod shape, as long as it facilitates smooth sliding when coupled with the moving pedal. In one embodiment, the pedal 171 of the chassis unit 110 may comprise stripes to increase friction, enhancing its anti-slip properties. On two opposite sides of the chassis body 150, there are two mounting locking plates 113. These two mounting locking plates 113 have a receiving surface 114 aligned with the flat upper surface 112 of the chassis unit 110, allowing them to mount and carry other components.

The wheel caster set 120 comprises at least multiple universal wheel caster sets 122, at least one directional wheel caster set 124, two long legs 121, and two short legs 123. The universal wheel caster sets 122 have unrestricted movement direction on the horizontal plane when rotating. In the depicted embodiment, the wheel caster set 120 consists of four universal wheel caster sets 122. The wheel caster sets are pivotally mounted on two opposite sides of the chassis unit 110 through two long legs 121, two short legs 123, and pivot shafts 125. The long legs 121 and short legs 123 are positioned beneath the chassis unit 110 through the mounting locking plates 113 the pivot shaft 125. That is, each side end of the chassis unit 110 is equipped with one long leg 121, one short leg 123, and two universal wheel sets 122. A universal wheel caster set 122 is attached to one end of each long leg 121 and each short leg 123, while the other end is fixed beneath the chassis unit 110. Two long legs 121 and two short legs 123 are positioned on the front and rear sides of the chassis unit 110. Please note that the diameter of the universal wheel caster set 122 installed on the short leg 123 is larger than the diameter of the universal wheel caster set 122 installed on the long leg 121. Control devices are provided on both the long leg 121 the short leg 123 to control the positioning and locking of the universal wheel caster sets 122. The two long legs 121 of the caster set 120 can swing open and close, facilitating compatibility with assistive devices such as wheelchairs. Opening the two long legs 121 enhances the overall stability of the main unit module 1.

In order to enhance controllability and safety during shifting, the directional wheel caster set 124 is designed to only move in a predefined direction on the horizontal plane when it rotates. The directional wheel caster set 124 is positioned near the middle of the front side of the chassis unit 110 and enclosed within a horizontal area formed by the vertices of the universal wheel caster sets, and includes a directional wheel 127, an elastic device 128, and a switching device 126. The directional wheel 127 is movably installed beneath the directional wheel caster set 124 through the elastic device 128, allowing the axis position of the directional wheel 127 to be adjusted vertically. The directional wheel caster set 124 ensures continuous ground contact of the directional wheel 127 through the action of the elastic device 128, maintaining its effectiveness throughout the movement. The switching device 126 is positioned near the directional wheel 127, the switching device 126 is used to controls the directional wheel's orientation, enabling it to be fixed in a predefined direction or left in a freely rotatable state. In other words, activation of the switching device 126 stabilizes the forward direction of the directional wheel 127, directing the shifting module 100 to move in the predefined direction. Conversely, deactivating the switching device 126 allows the directional wheel 127 to rotate freely, similar to a universal wheel, permitting movement in any direction. The switching between directional and non-directional states can be achieved through any suitable directional mechanism. For instance, the switching device 126 the directional wheel 127 may comprise positioning pins and corresponding positioning holes (not shown in the figure). By coupling or decoupling the two switching operations, the directional wheel 127 can be in a directional or non-directional state, thereby meet the shifting operation requirements of different applications. The directional wheel 127 can provide multiple directional positions, enabling the switching device 126 to alter its positioning direction. This configuration of the wheel caster set 120 enhances the stability and ease of movement for the shifting module 100 the main unit module 1, providing more convenient control. Additionally, the directional wheel caster set 124 the moving pedal 170 have the capability to move relative to the long leg 121 toward the short leg 123.

The supporting frame module 200 comprises multiple upright poles 210 and multiple connecting plates 220. One end of the upright poles 210 is attached and secured to the chassis unit 110 of the shifting module 100, while the other end is connected and fixed below the multiple connecting plates 220. In other words, the multiple connecting plates 220 are positioned above the chassis unit 110, the upright poles 210 span between the chassis unit 110 the multiple connecting plates 220. As illustrated, one end of the upright poles 210 is mounted and fixed on the receiving surface 114 of the mounting locking plates 113 of the chassis unit 110. This configuration allows the moving pedal 170 of the chassis unit 110 to move towards the short leg 123 relative to the long leg 121 without hindrance.

A plurality of first keyholes 212 are arranged along the vertical direction on the upright pole 210, forming a coupling interface designed to install and lock caring modules with different functions. The number and spacing of these holes can be adjusted on the four upright poles 210 according to specific requirements. The first keyhole 212 creates four independent coupling interfaces that can collaborate with each other. The installation height of caring modules with different functions can be customized by utilizing the first keyholes 212 located at various heights on the four upright poles 210. On the horizontal surface of the connecting plate 220, there are multiple first mounting holes 222 (forming a coupling interface), and on the vertical surface, there are multiple second keyholes 224. These can be utilized in conjunction with multiple fasteners 226 to establish another coupling module device and secure the components installed in the first mounting hole 222. One end of the upright pole 210 is affixed to the first mounting holes 222 and secured beneath the connecting plate 220 using the second keyholes 224 and fasteners 226. The arrangement of the first keyholes 212, the first mounting holes 222, the second keyholes 224 may be at equal intervals, but are not limited to. It can be understood that the multiple upright poles 210 are employed to fix the multiple connecting plates 220 above the chassis unit 110, enabling the main unit module 1 to install care modules or other components with various functions through the multiple upright poles 210 and connecting plates 220.

To provide further clarification, in a specific embodiment, the connecting plates 220 are horizontally installed and perpendicular to the upright poles 210. The upright pole 210 may be a hollow cylindrical tube and made of metal material, while the connecting plate 220 is generally elongated with a certain thickness to facilitate the arrangement of through holes. The multiple first mounting holes 222 on the connecting plate 220 are positioned vertically and are designed as through holes. The multiple second keyholes 224 the multiple fasteners 226 on the connecting plate 220 are arranged horizontally and perpendicular to the multiple first mounting holes 222.

The coupling module 10 comprises multiple coupling devices 12 and coupling interfaces that are disposed on the supporting frame module 200 and can be used independently or in conjunction with the supporting frame module 200 to attach and secure caring modules with various functions. The coupling device 12 is slidably encased on the and secured to upright pole 210 through the first keyholes 212. Different caring modules with diverse functions can be mounted and secured on the pole 210 using the first keyholes 212 the coupling devices 12. Different caring modules are positioned on one side of the supporting frame module 200, enabling convenient and rapid adjustment of care at different heights. Additionally, besides the first keyhole, the first mounting hole on the connecting plate, the second mounting hole on the chassis unit can also serve as coupling interfaces for attaching the care module. That is, the coupling interface of the coupling module 10 may include, but is not restricted to, the first keyholes 212, the first mounting holes 222, the second mounting holes 115. In certain applications, the caring module can be directly combined with the corresponding coupling interface and installed on the main unit module 1 without the need for a coupling device. Referring to FIGS. 1 and 2, for quickly and swift height adjustment, the coupling device 12 also comprises a height adjustment device 311. The height adjustment device 311 is slidably mounted on the upright pole 210 and comprises positioning pins 3110 for coupling and locking with the plurality of first keyholes 212 on the upright pole 210. The number of positioning pins 3110 may be one or more, ensuring a secure lock of the guardrail 320 on the upright pole 210. A switch operating member 3111 is utilized to operate the combination or disengagement of the positioning pins 3110 from the first keyholes 212.

Referring to FIG. 2 with reference to FIG. 1, the main unit module 1 may also include a plurality of support rods 130 and 140 in different forms, the support rods 130 and 140 are horizontally supported on a plurality of connecting plates 220. The support rod 130 can be installed and locked above the connecting plates 220 through the first mounting hole 222, the second keyhole 224 the fastener 226, the support rod 130 is placed horizontally and located in front of the user (using the upright pole 210 of the main unit module 1 as the reference point, the user's side is the front, the caregiver's standing side is the rear) for the user to hold, support, etc. In one embodiment, the support rod 130 may be a hollow cylindrical tube made of metal to maintain certain rigidity and load-bearing strength.

The support rod 140 can be installed and secured through the first mounting hole 222, the second keyhole 224, the fastener 226. The support rod 140 is positioned horizontally above the connecting plate 220 and located behind the user (with the upright pole 210 of the main unit module 1 as the reference point, where the user's side is the front, the caregiver's standing side is the rear), the support rod 140 enables the caregiver or user to control the movement of the main unit module 1. The support rod 140 may symmetrically provide two handles 142 located at both ends of the support rod 140. The handle 142 is generally L-shaped and positioned in the upper spatial area between the plurality of connecting plates 220. The handle 142 can be either integrally formed with the support rod 140 or separately manufactured and then installed on the support rod 140, either by welding and fixation or by being sleeved and locked. The two handles 142 can be equipped with braking handgrips 144. The braking handgrips 144 are connected and can control the two braking devices 129 symmetrically installed on the chassis unit 110, facilitating the caregiver or user in controlling the braking handgrips 144 to operate and control the movement of the main unit module 1. At this point, the support rod 140 can function as a push module 3.

According to usage requirements, the support rod 140 can be installed on a plurality of connecting plates 220 with different orientations to achieve various functions. When the handle 142 the braking handgrips 144 of the support rod 140 face the caregiver, the caregiver can control the movement of the main unit module 1. On the other hand, when the handle 142 the braking handgrips 144 of the support rod 140 face the user, the user can control the movement of the main unit module 1 or receive support by holding, supporting, etc. In this scenario, users can utilize the main unit module 1 for standing training and/or walking training. When the user stands on the chassis unit 110 of the shifting module 100, holding both hands on the support rod 130 the support rod 140, the user can use the main unit module 1 to engage in standing training or perform simple walking exercises.

Figure 4:
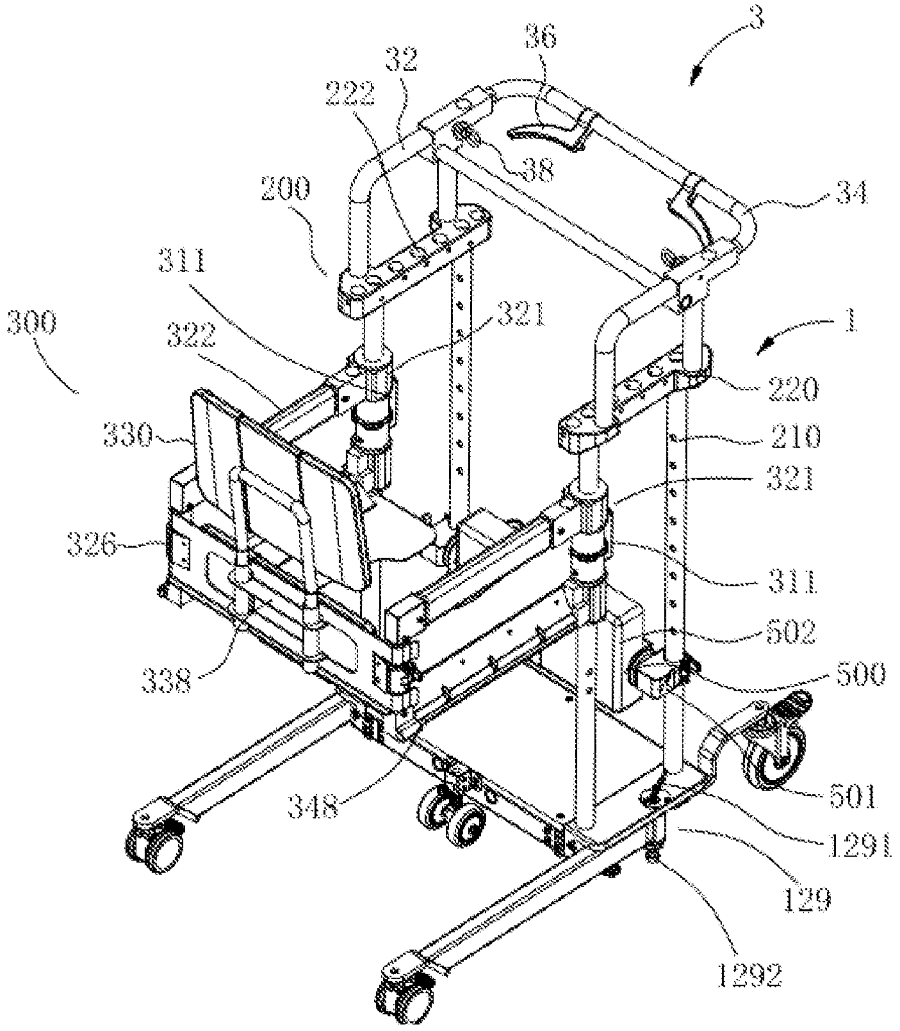
FIG. 4 is a perspective view of an embodiment of a caring machine of the present invention.

Referring to FIG. 4, in conjunction with FIGS. 1 and 2, FIG. 4 depicts a perspective view of an embodiment of the caring machine of the present invention. To achieve at least one of the aforementioned advantages or other advantages, an embodiment of the present invention provides a caring machine 2 that can be equipped with caring modules with different functions. The caring machine 2 at least includes the previously mentioned main unit module 1 and a push module 3. The push module 3 is installed on the main unit module 1 and can control the activation process of the caring machine 2. The push module 3 may have different forms and structures, such as the aforementioned support rods 130 and 140.

The push module 3 may consist of a mounting bracket 32, a handrail 34, and multiple braking handgrips 36. The mounting bracket 32 is installed above the connecting plate 220 of the supporting frame module 200 through multiple first mounting holes 222. The handrail 34, generally U-shaped, is attached and fixed to one side of the mounting bracket 32, positioned above the short leg 123 of the wheel caster set 120 of the shifting module 100. The handrail 34 is used to serve as a point for users or caregivers to hold and support. The multiple braking handgrips 36 are symmetrically arranged on the handrail 34. After locking the braking handgrips 36, they face the mounting bracket 32 and can be used to control the movement of the caring machine 2. The braking handgrips 36 can connect to two braking devices 129 symmetrically installed on the chassis unit 110 to control the movement of the caring machine 2. Referring to FIGS. 2 and 4, in one embodiment, the braking device 129 consists of an operating rod 1291 and an activation rod 1292. The operating rod 1291 is connected to the braking handgrips 36 through a brake line (not shown in the figure) and can be linked to the activation rod 1292 through a lever principle. In this way, the user can tighten or loosen the braking handgrips 36 on the handrail 34, allowing the operating rod 1291 to move the activation rod 1292 closer to or farther from the ground, thereby completing the braking operation function. Therefore, the two symmetrically installed braking devices 129 the corresponding two braking handgrips 36 form a complete braking module, enhancing the safety of the caring machine 2 during movement. It's important to note that the brake module's components the combined actuation methods presented here are examples and can be replaced by other brake modules with similar functions. The mounting bracket 32 can be assembled using multiple rods and mounting parts, then installed above the connecting plate 220 of the supporting frame module 200 through multiple first mounting holes 222. Both ends of the handrail 34 are attached and secured to the mounting bracket 32 through multiple mounting parts. The mounting bracket 32 is equipped with a safety hook 38, providing the capability to hang straps and other items.

When the user engages in standing training with the assistance of the caring machine 2, they can stand on the chassis unit 110 of the shifting module 100 while gripping the mounting bracket 32 of the push module 3. In this scenario, the user can utilize a retractable sling to support their buttocks. The two ends of the retractable sling are secured to the safety hook 38 on the mounting bracket 32, providing a specific tension to maintain ample bearing capacity, thereby protecting and supporting the user Please refer to FIG. 4 again. In one embodiment, the caring machine 2 may also comprise a top support module 500 installed on the supporting frame module 200 of the main unit module 1. Specifically, it can be secured to the upright poles 210 of the supporting frame module 200 through first keyholes 212, the top support module 500 is locked in place through the first keyholes 212. The top support module 500 can be adjustable, allowing for upward, downward, forward, and backward position adjustments based on usage conditions.

The top support module 500 consists of an attachment bracket 501 and a seatback cushion 502. The attachment bracket 501 is affixed to the upright poles 210 through the first keyholes 212, providing support to the supporting frame module 200. The seatback cushion 502 is positioned on the attachment bracket 501 and oriented towards the user, providing support to the user's knees and assisting users in transitioning between sitting and standing or standing up. In various usage scenarios, the top support module 500 can serve not only to support the knees or legs but also other body parts such as the torso, head, and hands.

Figure 5:
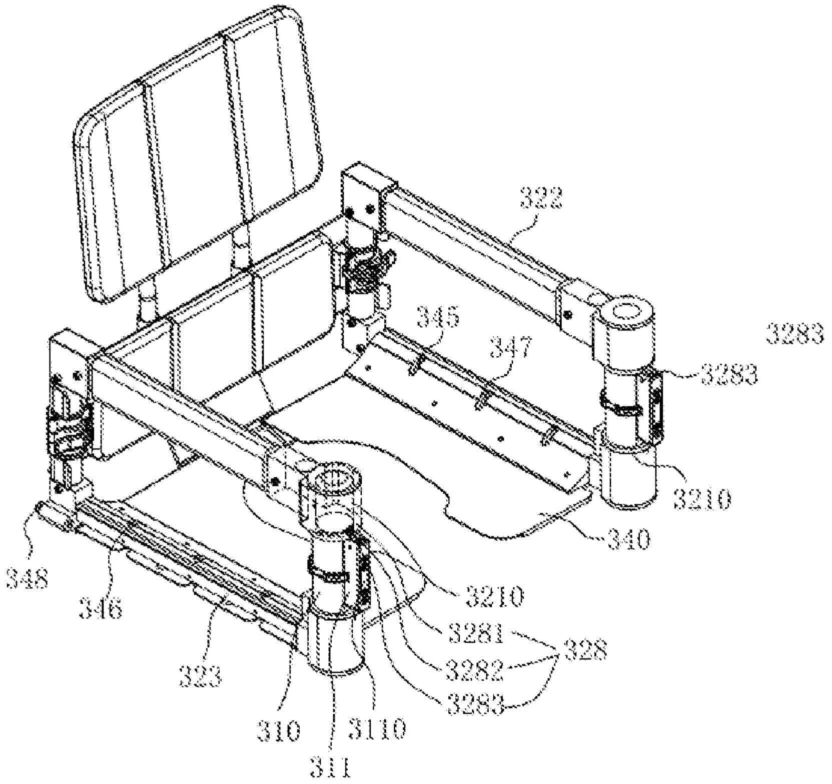
FIG. 5 is a perspective view of an embodiment of a carrying module as shown in FIG. 2.
Figure 6:
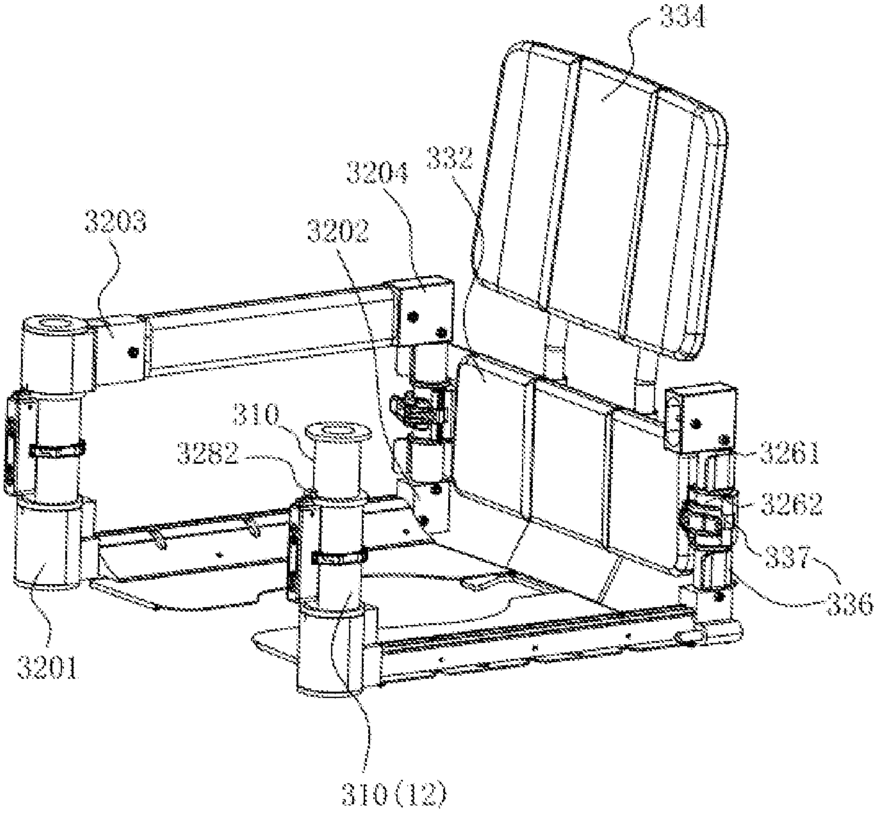
FIG. 6 is a perspective view of a pivot-mounted locking devices as shown in FIG. 5.

As depicted in FIGS. 4 to 6, in an embodiment, the caring machine 2 comprises a carrying module 300 mounted on the main unit module 1. The carrying module 300 is designed to provide diverse care functionalities, the carrying module 300 comprises at least two attachment bases 310, two guardrails 320, a backrest assembly 330, and two load-bearing plates 340.

The two attachment bases 310 are socket-mounted on the supporting frame module 200 of the main unit module 1. Depending on the specific functions or utilization needs of the carrying module 300, it can be securely positioned at various locations or heights on the main unit module 1. As illustrated, the two attachment bases 310 can be slid onto and enclosed at the upright poles 210 and subsequently connected and secured through the first keyholes 212, effectively attaching them to the upright poles 210 of the supporting frame module 200 of the main unit module 1. Each end of the two guardrails 320 is pivotally connected to the respective attachment bases 310, allowing horizontal rotation around the attachment bases 310. The guardrails 320 can expand outward, to the left, to the right, or be brought close together. The opposite ends of the two guardrails 320 can be linked and secured to the backrest assembly 330, respectively. Additionally, the carrying module 300 is equipped with a self-locking positioning device 328, automatically securing the guardrail 320 when it is closed or positioned in a specific orientation, thereby constraining the horizontal rotation of the guardrails 320.

In certain embodiments, the attachment base 310 can be sleeved and mounted it onto the coupling device 12. Additionally, each guardrail 320 is equipped with a pivot device 321 positioned at one end of the guardrail 320 near the upright pole 210. The self-locking positioning device 328 comprises at least one positioning hole 3281 and at least one positioning pin 3282, which are respectively and correspondingly located on the attachment base 310 the guardrail 320. When the guardrails 320 are closed or positioned in a specific orientation on the attachment base 310, the positioning pins 3282 on the attachment base 310 or the guardrail 320 will automatically engage and secure into the positioning holes 3281 on the guardrail 320 or the attachment base 310. In the embodiment depicted in FIG. 5, the attachment base 310 the coupling device 12 form an integral unit. In other words, the attachment base 310 in this embodiment integrates the functionalities of the coupling device 12. The height of the carrying module 300 can be easily adjusted by manipulating the height adjustment device 311 and facilitating quick adjustments. The pivot device 321 includes a pivot hole 3210 for being fitted onto the rotating rod of the attachment base 310. The self-locking positioning device 328 has a positioning hole 3281 located on the pivot device 321, the positioning pin 3282 is disposed on the attachment base 310. When the guardrails 320 are closed or positioned in a specific orientation, the positioning pin 3282 of the self-locking positioning device 328 automatically locks into the positioning hole 3281, restricting the horizontal rotation of the guardrail 320. To change the position of the guardrail 320 through rotation, the user simply needs to press the release button 3283 connected to the positioning pin 3282 on the attachment base 310. This action disengages the positioning pin 3282 from the positioning hole 3281 so as to release the self-locking position.

Each guardrail 320 comprises at least two long rods 322 and 323. The two long rods 322 and 323 are arranged parallel to each other vertically, and can be interconnected and secured through multiple connecting rods (not shown in the figure). There is a specific distance between the two long rods 322 and 323. The two ends of each long rod, 322 and 323 are equipped with pivot devices 321 and pivot locking devices 326, respectively, for installation and locking so as to ensure that the two long rods 322 and 323 are provided in the same plane after attachment and fixation. One end of each guardrail 320 is pivotally connected and fixed to the attachment base 310 via a pivoting device 321, while the other end is connected and secured to the backrest assembly 330 via a pivot locking device 326. In the embodiment illustrated in FIG. 6, the pivot locking devices 326 consist of a pivot sleeve 3261 connected to a vertical connecting rod (not shown) and a hook locking member 336 installed on the side of the backrest assembly 330. The pivot sleeve 3261 comprises a positioning groove 3262. In addition to the connecting rod, in other embodiments, the pivot sleeve 3261 can also be sleeved on the vertical rod at one end of the guardrail.

Figure 5A:
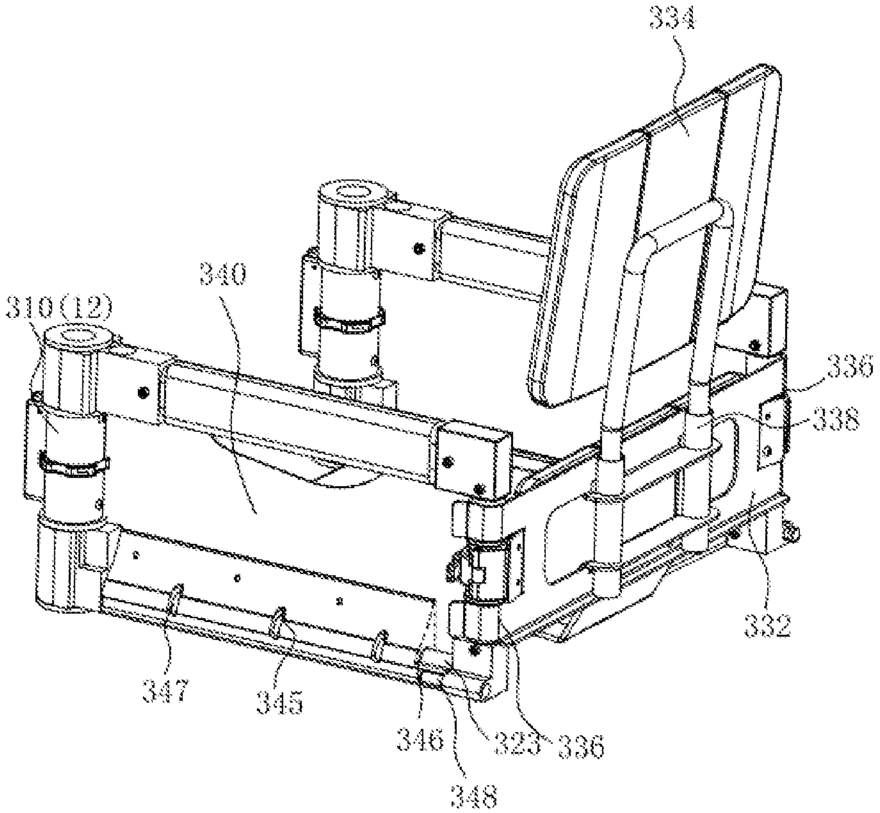
FIG. 5A is a perspective view of the carrying module as shown in FIG. 5 from another perspective.

As shown in FIGS. 5 and 5A, the lower long rod 323 of the two parallel long rods of each guardrail 340 is installed horizontally on the bottom of the guardrail 320 to serve as the rotating rod of the load-bearing plate 300. The rotating rod 323 is provided with a plurality of limiting pins 345. The two load-bearing plates 340 are rotatably mounted on the rotating rods 323 that is positioned at the bottom of the two guardrails 320 or below respectively. One side of each load-bearing plate 340 is provided with a pivot groove 346, which can be a U-shaped groove. The load-bearing plate 340 is sleeved on the rotating rod 323. The pivot groove 346 is provided with a plurality of elongated holes 347 for mounting a plurality of limit pins 345, so that the load-bearing plate 340 can be placed horizontally to carry the load and can be lifted upward to get close to the guardrail 320. When the load-bearing plate 340 is lifted upward, the pivot groove 346 rotates around the rotating rod 323, and can be moved closer to the guardrail 320. The guardrail 320 is fixed with positioning pin 348 to prevent the load-bearing plate 340 from falling during use and affecting the use of the guardrail 320. When the load-bearing plate 340 is lifted up and close to the guardrail 320, it will be convenient for the carrying module 300 to be used for other functions besides carrying the user. For example, the carrying module 300 can be used as a support for the user. When the two load-bearing plates 340 are placed horizontally the user sits on the load-bearing plates 340, the backrest assembly 330 can support and protect the user's back for safety. When the load-bearing plate 340 is not needed, it can be quickly removed after being lifted up, so that the carrying module 300 can be used for other functions besides carrying the user.

The load-bearing plates 340 are positioned beneath or at the bottom of the guardrail 320. They can be detachably installed on the bottom of the guardrail 320 through the pivot groove 346, allowing rotation relative to the rotating rod 323. Each load-bearing plate 340 is designed with an arc-shaped notch 342. When the two load-bearing plates 340 are laid flat and closed, the two arc-shaped notches 342 face each other to create an opening 344. In this configuration, the two load-bearing plates 340 can be used to carry the user, essentially serving as a riding platform in the carrying module 300. Additionally, when the two load-bearing plates 340 are laid flat and closed, an opening 344 is formed, corresponding to the size of a toilet seat cavity. This feature facilitates the use of the toilet by individuals with disabilities, adding versatility to the carrying module 300.

Referring to FIGS. 4 and 5 again, the backrest assembly 330 comprises a backrest seat 332 and a backrest 334. The backrest seat 332 comprises multiple hook locking members 336 and a backrest mounting base frame 338. Each hook locking member 336 is equipped with a fastener 337, which securely connects and locks with the pivot sleeve 3261 of the guardrail 320. The backrest mounting base frame 338 is positioned above the backrest seat 332 or at other suitable locations, the backrest mounting base frame 338 serves as a receptacle for various types of backrests 334. Apart from the two backrest attachments on the backrest mounting base frame 338, alternative structures can be employed to detachably affix the backrest 334 to the backrest seat 332. In one embodiment, the backrest seat 332 consists of a flat plate, the hook locking members 336 are disposed on two opposite sides of the flat plate, engaging and securing with the positioning grooves 3262 on the pivot sleeve 3261 of the guardrail 320, respectively. Consequently, the two guardrails 320 can maintain uniformity in their vertical and horizontal orientations. Furthermore, when only one side of the hook locking member 336 on the backrest seat 332 engages with the pivot sleeve 3261, the backrest seat 332 the pivot sleeve 3261 can rotate at any angle. As depicted in FIG. 5A, the backrest mounting base frame 338 consists of two backrest sockets and is positioned at the central location behind the backrest seat. The backrest socket 338 can accommodate various types of backrests 334 to cater to diverse application scenarios or individual preferences. The hook locking members 336 and the pivot sleeves 3261 on two opposite sides of the backrest seat can be secured through fitting, snap-on locking, or other rapid installation and removal locking mechanisms.

Figure 7:
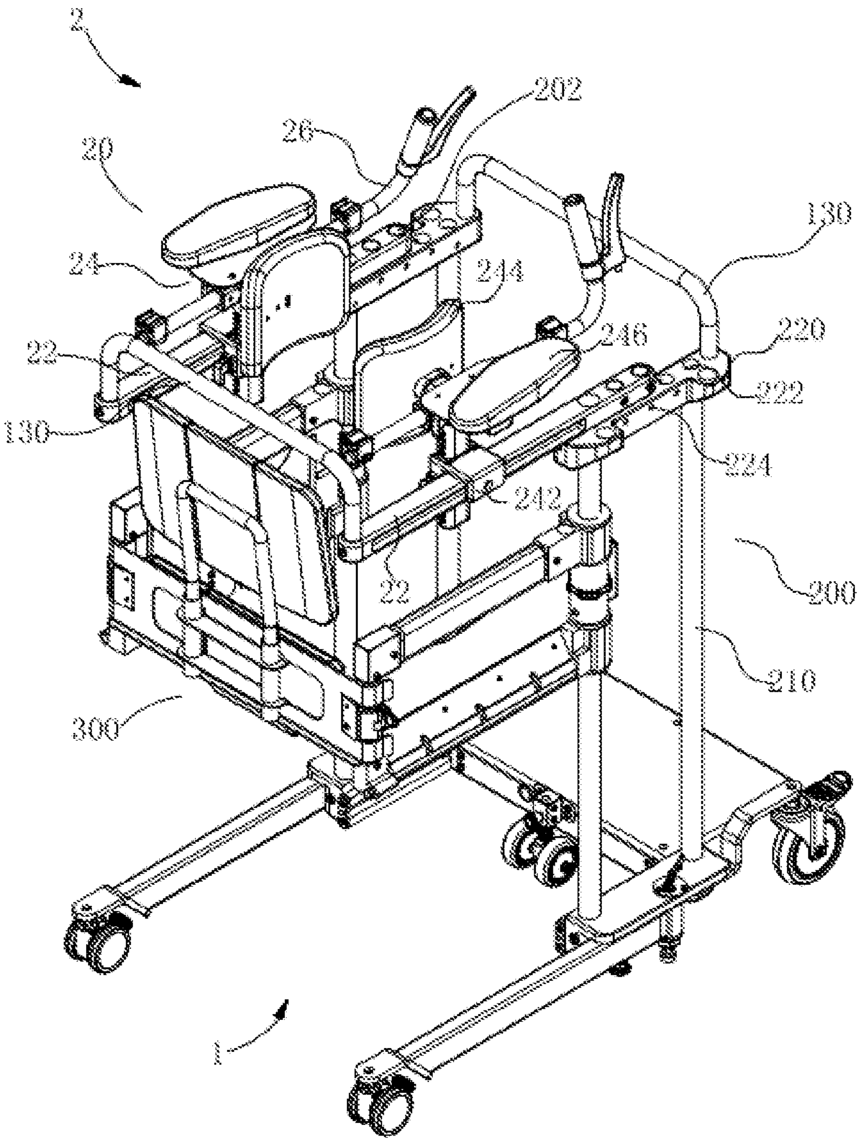
FIG. 7 is a perspective view of another embodiment of a caring machine according to the present invention.
Figure 8:
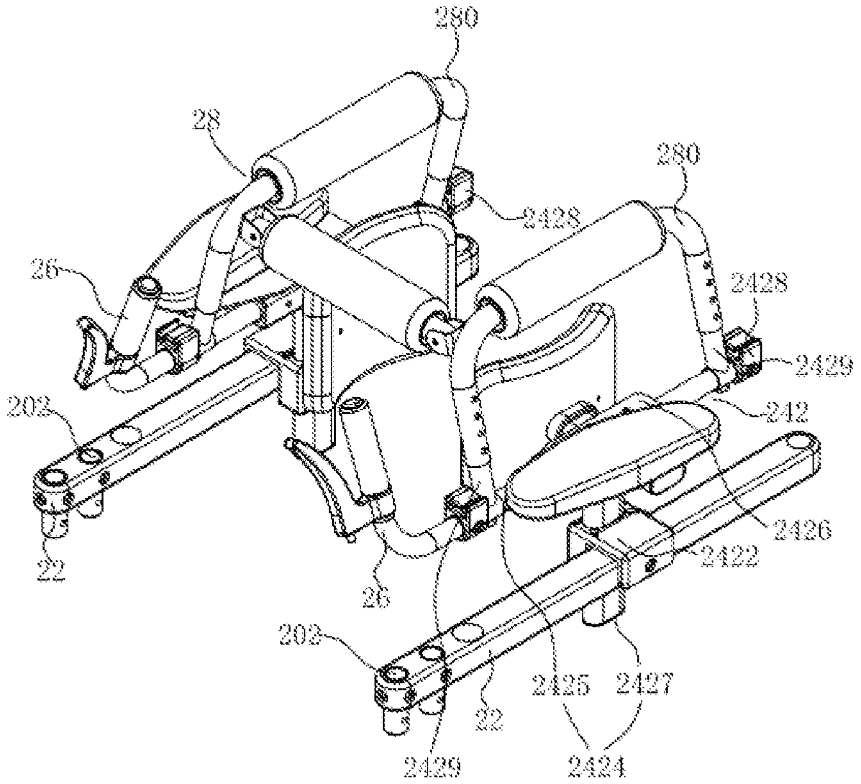
FIG. 8 is a perspective view of an embodiment of a support module of a caring machine as shown in FIG. 7 according to the present invention.
Figure 9:
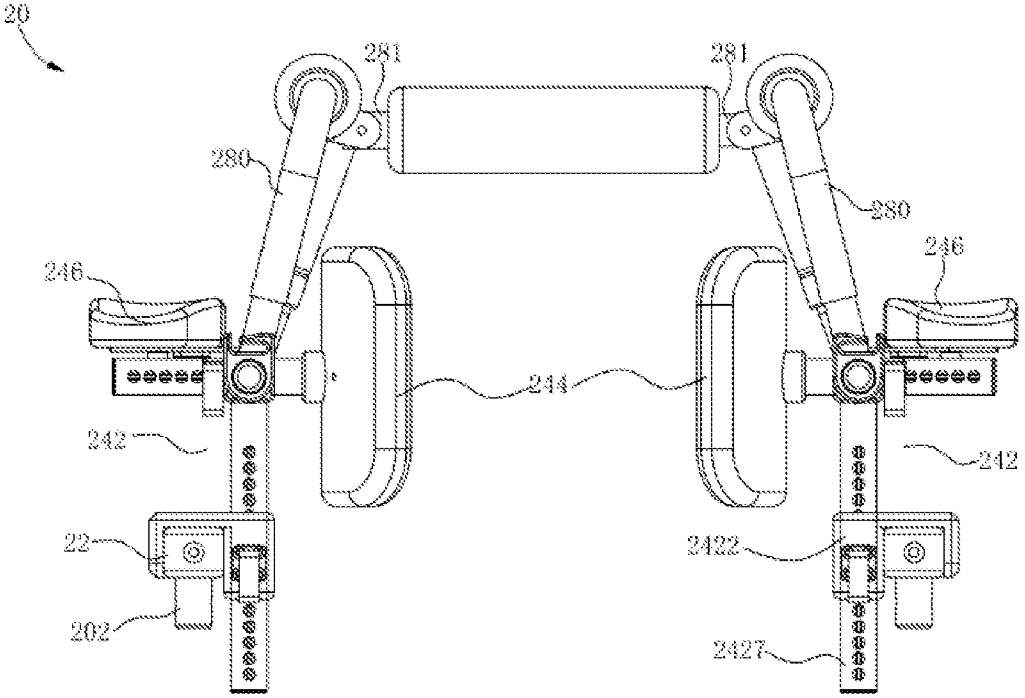
FIG. 9 is a top perspective view of the support module as shown in FIG. 7.

Please refer to FIGS. 7, 8, and 9 in conjunction with FIGS. 2 and 4. FIG. 7 is a perspective view of another embodiment of the caring machine of the present invention. FIG. 8 depicts a perspective view of the embodiment of a support module in the caring machine shown in FIG. 7. FIG. 9 is a top perspective view of the support module shown in FIG. 8.

Please refer to FIG. 7 in conjunction with FIG. 2 and FIG. 4. When the caring machine 2 is loaded with the carrying module 300, it can also include a support module 20, which is installed on the supporting frame module 200 of the main unit module 1. It can be used as an assistive device in conjunction with the carrying module 300, or it can be used alone in conjunction with the main unit module 1. The support module 20 includes at least two receiving rods 22, two supporting devices 24, and two braking handles 26. Each receiving rod 22 has a plurality of attachment pins 202. In the figure, the configuration of the receiving rod 22 is the same as or similar to the connecting plate 220, but it may be different. The two receiving rods 22 are horizontally installed on the connecting plate 220 through the first mounting holes 222 and the attachment pins 202, respectively, and are locked through the second keyholes 224 the fasteners 226. The two supporting devices 24 are installed on the two receiving rods 22, respectively.

Each supporting device 24 comprises a mounting bracket set 242, a support member 244, and a support pad 246. The mounting bracket set 242 is sleeved and secured on the receiving rod 22, while the support member 244 the support pad 246 are adjustably fixed on the mounting bracket set 242. The support member 244 can adjust the distance between itself the mounting bracket set 242 left and right along the horizontal direction, the support pad 246 can rotate 360 degrees relative to the mounting bracket set 242 in a horizontal plane to adjust its fixed angle position. The two braking handles 26 are respectively installed on the two mounting bracket sets 242 to control the movement of the caring machine 2.

Referring to FIG. 8 in conjunction with FIG. 7, in one embodiment, the support module 20 may further comprise a supporting device 28. The supporting device 28 is assembled from a plurality of adjustable rods 280 and is generally U-shaped. Its two ends are respectively installed on the two mounting bracket sets 242 and are positioned above the two supporting devices 24.

Please refer to FIG. 9 in conjunction with FIGS. 7 and 8. To elaborate further, the mounting bracket sets 242 of the supporting devices 24 include a sleeve member 2422, a mounting bracket 2424, an attachment plate 2426, and a plurality of fasteners 2428. The sleeve member 2422 is slidably sleeved and locked on the receiving rod 22, serving to receive and install the mounting bracket 2424. The mounting bracket 2424 is adjustably installed on the sleeve member 2422. Once installed and secured, the mounting bracket 2424 is perpendicular to the receiving rod 22 and can be adjusted up and down vertically relative to the receiving rod 22. The attachment plate 2426 can be mounted on the mounting bracket 2424 along a horizontal plane to accommodate the support pad 246. In this configuration, the support pad 246 can rotate 360 degrees relative to the attachment plate 2426 within this horizontal plane to adjust its fixed angle position. A plurality of fasteners 2428 are installed on the mounting bracket 2424 and can be used to connect and secure the braking handle 26.

The mounting bracket 2424 typically has a T-shaped configuration, comprising a horizontal rod 2425 and an upright rod 2427. A mounting rod 2429 is disposed at each end of the horizontal rod 2425. The mounting rods 2429 are adjustable and securely attached to the two ends of the adjustable rod 280 of the supporting device 28. Consequently, the supporting device 28 can be adjusted in height along the vertical direction and in width along the horizontal direction.

One side of the sleeve member 2422 of the mounting bracket set 242 is provided with a groove, while one side of the groove contains a keyhole. The sleeve member 2422 can smoothly slide along the receiving rod 22 via the groove. Once it reaches a predetermined position, it securely locks onto the receiving rod 22 through the keyhole. The upright rod 2427 within the mounting bracket 2424 passes through a through hole in the sleeve member 2422 and is then locked in place. By adjusting the vertical position of the upright rod 2427, the overall height of the support module 20 can be modified. The mounting plate 2426, typically an oval-shaped thin plate, is affixed above the horizontal rod 2425 of the mounting bracket 2424 using screws or similar fasteners. The support pad 246 is then mounted onto the mounting plate 2426 in a manner that allows for rotation and adjustment. A plurality of fasteners 2428 are positioned at both ends of the horizontal rod 2425 within the mounting bracket 2424, with one end connected and secured to the braking handle 26. The fastener 2428 comprises a hook-shaped structure, which can support loads, such as hanging a sling for weight-bearing purposes. The braking handle 26 is outfitted with both a control handle bar and a control button, enhancing control over the actions of the caring machine 2. The support member 244 comprises a support pad and a support mounting rod. An attachment base device is disposed at the junction between the horizontal rod 2425 the upright rod 2427 within the mounting bracket 2424. The support mounting rod of the support member 244 possesses a specific length and can be adjusted for attachment to the mounting device located at the junction between the horizontal rod 2425 the upright rod 2427 within the mounting bracket 2424. The adjustability is provided for the modification of the distance between the two support members 244 the support module 20 positioned on the same horizontal plane.

One end of the mounting rod 2429 positioned at both ends of the horizontal rod 2425 within the mounting bracket 2424 is sleeved onto and secured at one end of the horizontal rod 2425. A positioning pin is defined at the opposite end of the mounting rod 2429. The supporting device 28 is composed of multiple adjustable rods 280 and generally takes on a U-shaped configuration. The supporting device 28 comprises two U-shaped adjustable rods 280, each featuring multiple mounting holes at both ends. The mounting holes located at both ends of each U-shaped adjustable rod 280 are connected and secured with the positioning pins of the two mounting rods 2429 within the mounting bracket 2424. Vertical installation height adjustment of the supporting device 28 is achieved by modifying the locking positions of the mounting holes on the U-shaped adjustable rod 280 in conjunction with the positioning pins on the mounting rod 2429. The two U-shaped adjustable rods 280 are connected and secured by two straight adjustable rods 281. One end of each straight adjustable rod 281 is connected and locked onto the U-shaped adjustable rod 280, while the other end of the straight adjustable rods 281 is provided with an equal number of mounting holes, securing them horizontally via these mounting holes. Adjustment of the installation spacing of the supporting device 28 along the horizontal direction is accomplished by modifying the locking positions of the mounting holes on the two straight adjustable rods 281. Multiple adjustable rods 280 and 281 may be provided with an elastic buffer sleeve to enhance the comfort of the supporting device 28. The elastic buffer sleeve can be made from various materials possessing elastic properties.

When the user stands on the chassis unit 110 of the caring machine 2, the two support members 244 of the supporting devices 24 can provide support to the user's waist, while the two support pads 246 can offer support to the user's hands. In cases where the user lacks sufficient upper torso strength, to prevent the user from leaning dangerously while standing, the supporting device 28 can secure and stabilize the user's chest and abdomen, enhancing stability on the caring machine. For instance, the supporting device 28 may be positioned under the user's armpits to provide more effective support, grip, and protection. Through this configuration, individuals with disabilities can utilize the caring machine 2 for basic body movement exercises such as standing.

Figure 10:
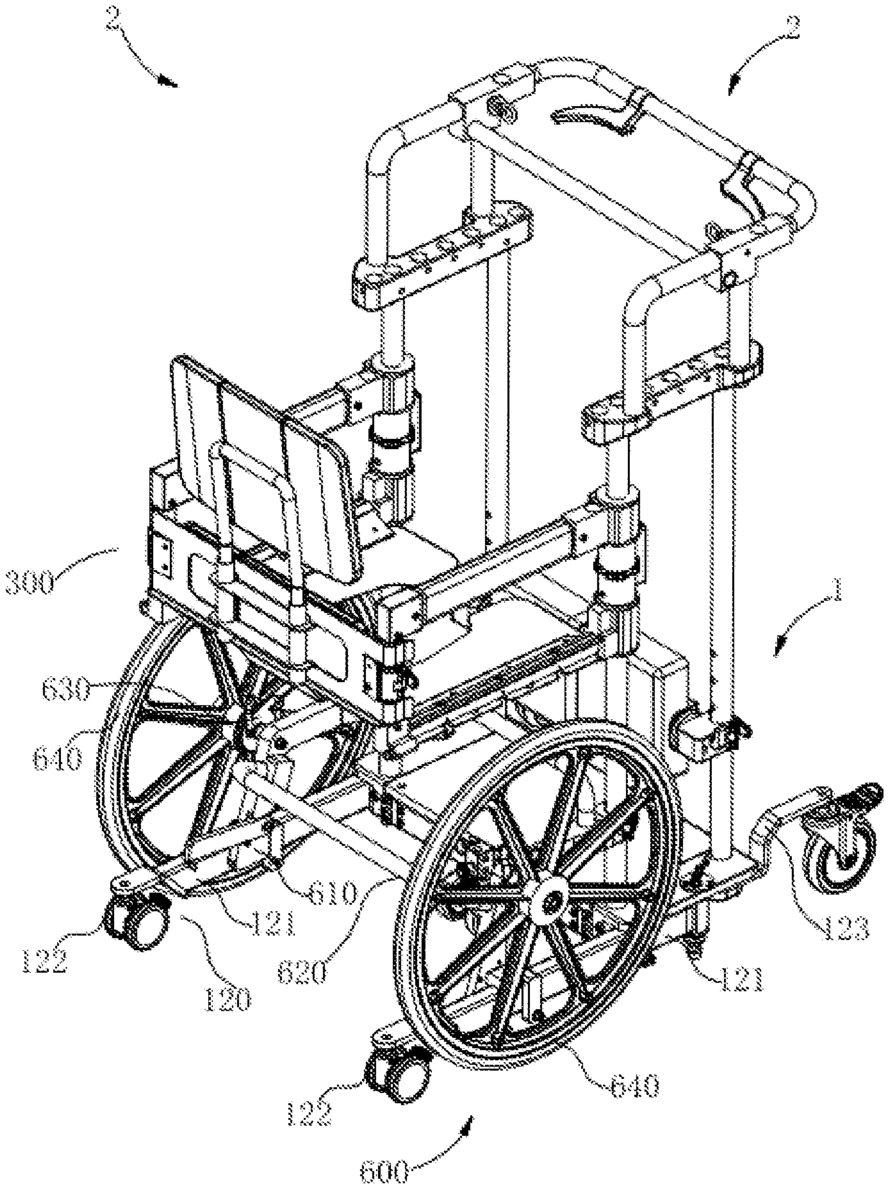
FIG. 10 is a perspective view of still another embodiment of a caring machine of the present invention.
Figure 11:
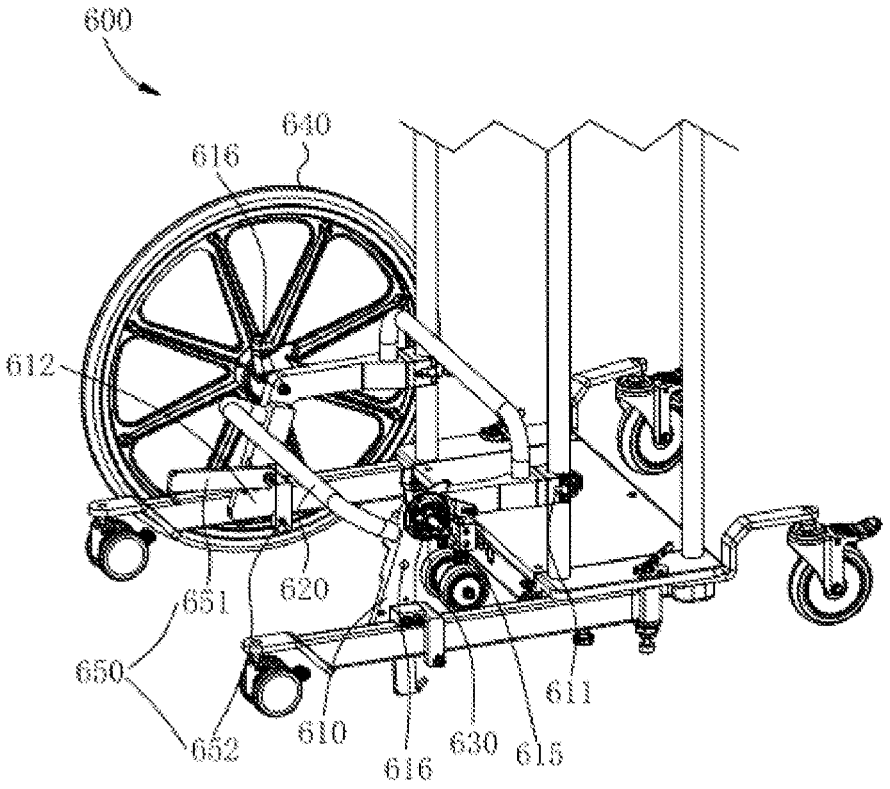
FIG. 11 is a perspective view of an embodiment of a primary wheel module of the caring machine shown in FIG. 10.
Figure 12:
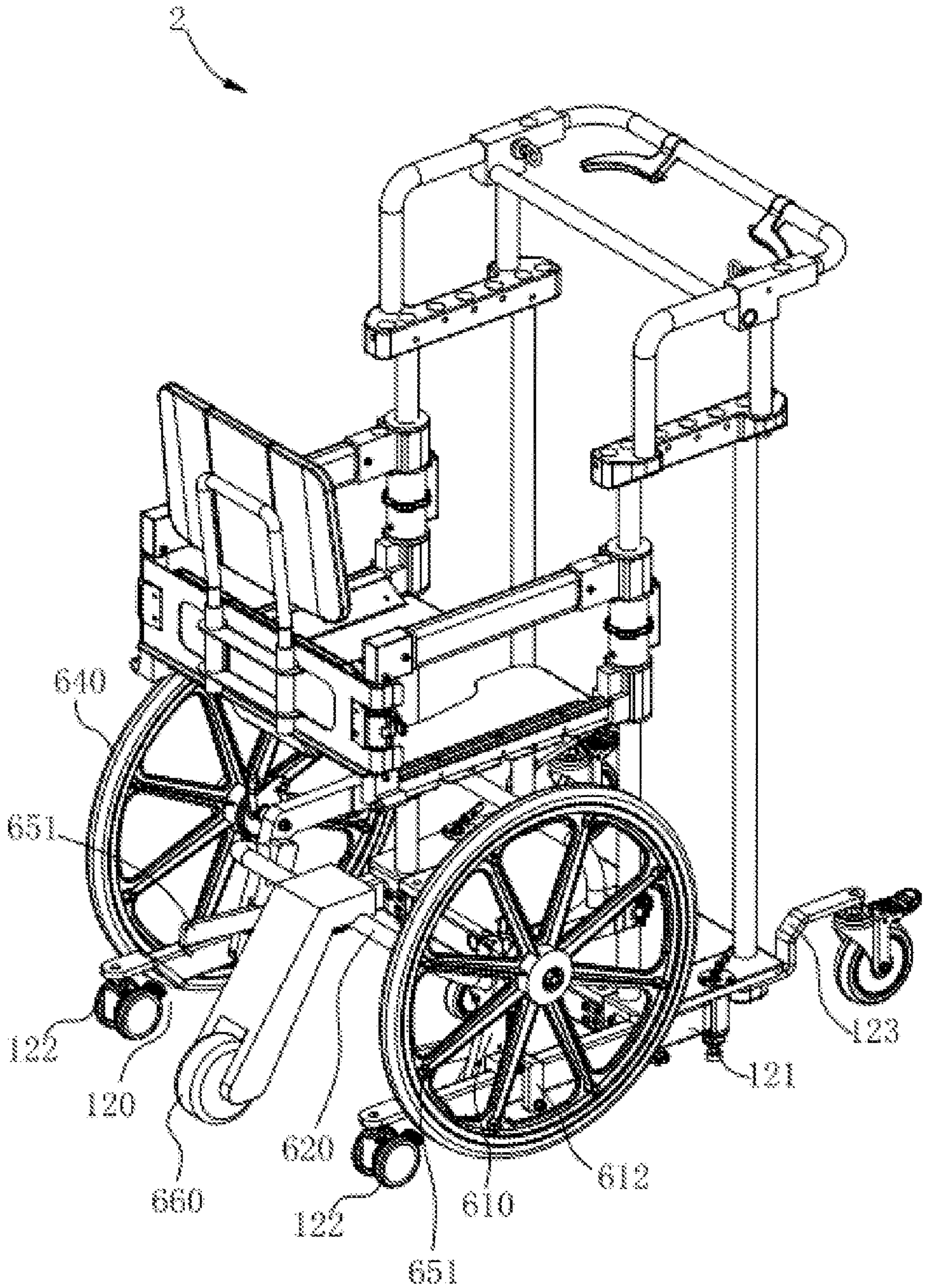
FIG. 12 is a perspective view of the primary wheel module depicted in FIG. 11 during operation.

Please refer to FIGS. 10 to 12 in conjunction with FIGS. 1 and 4. FIG. 10 is a perspective view of another embodiment of the caring machine of the present invention. FIG. 11 is a perspective view of an embodiment of the primary wheel module of the caring machine shown in FIG. 10. FIG. 12 is a perspective view of the primary wheel module shown in FIG. 11 during operation.

Please refer to FIG. 10 in conjunction with FIGS. 1 and 4. To further enhance the versatility and functionality of the aforementioned caring machine 2, additional features can be incorporated to serve multiple purposes. Specifically, the caring machine 2 can be provided with a primary wheel module 600 mounted on the main unit module 1. The primary wheel module 600 comprises at least two mounting brackets 610, a first crossbar 620, two braking mechanisms 630, and two primary wheels 640. The two mounting brackets 610 are symmetrically positioned on the upright pole 210, which supports the frame module 200 the wheel caster set 120 of the shifting module 100. Each mounting bracket 610 is installed on the long leg 121 of the wheel caster set 120. The two ends of the first crossbar 620 are connected and securely fixed to the two mounting brackets 610, thereby reinforcing the stability of the connection between the mounting brackets 610. The two braking mechanisms 630 are individually fitted onto the rotating rods 615 of the primary wheels 640 and are synchronized with the movement of the primary wheels 640. The two primary wheels 640 are affixed and secured through the rotating rods 615 that are respectively installed on the primary wheel rotating hole devices 616 of the mounting brackets 610, and two primary wheels 640 are positioned outside the mounting brackets 610.

As depicted in FIG. 11, the primary wheel module 600 may comprises a lifting device 650 that is positioned on the locking device 612 beneath the mounting bracket 610 (or symmetrically positioned on the wheel caster set 120 of the shifting module 100). The lifting device 650 enables adjustment of the height of the wheel caster set 120 connected to the mounting bracket 610 by controlling its operation. That is, manipulation of the lifting device 650 allows for the height adjustment of the long leg 121 in the wheel caster set 120, thereby raising the universal wheel caster set 122 on the long leg 121 to a certain distance from the ground so as to facilitate the installation of the primary wheel 640 to the mounting bracket 610. Subsequently, the primary wheel 640 is mounted onto the mounting bracket 610, serving as a replacement for the wheel on the long leg 121 in the wheel caster set 120. Each lifting device 650 comprises at least an elevated frame 651 and a set of limiting pins 652, and is used to elevate the wheel caster set 120 and simplify the process of installing or removing the primary wheel 640 onto/from the mounting bracket 610. In a word, the two elevated frames are lowered to make contact with the ground and are restricted by the limiting pins 652 from rotating upward. Subsequently, force is applied in the direction of the front wheels using the push module 3. As a result, the universal wheel caster set 122 of the long leg 121 is lifted to a certain distance from the ground using the point where the elevated frames 651 touch the ground as a fulcrum. At this point, the elevated frame 651 surpasses the highest point and is secured in a stable stationary state by another limiting pin 652. It facilitates the convenient installation or disassembly of the primary wheel 640 onto/from the mounting bracket 610.

Once the primary wheel 640 is installed, it serves as the wheel for the long leg 121 of the wheel caster set 120. Consequently, the primary wheel module 600 in conjunction with the short leg 123 of the wheel caster set 120 from the shifting module 100 is used to be as a wheel in the caring machine 2. It allows the caring machine 2 to function as a wheelchair outdoors, facilitating users in engaging in basic life activities outdoors.

To elaborate further, each mounting bracket 610 of the primary wheel module 600 comprises at least an upper locking device 611 and a lower locking device 612. The upper locking device 611 facilitates connection and locking with the upright pole 210 of the supporting frame module 200, while the lower locking device 612 is utilized for connection and locking with the long leg 121 of the wheel caster set 120 from the shifting module 100. The lifting device 650 can be installed on the lower locking device 612 under the mounting bracket 610. Thus, it's possible for straightforward and swift assembly and disassembly of the primary wheel module 600.

The primary wheel module 600 may also comprise a first crossbar 620 and an electric driving wheel 660. The first crossbar 620 is detachably affixed at both ends to the two mounting brackets 610. The electric driving wheel 660 is positioned at the center of the first crossbar 620 and is used to drive the movement of the main unit module 1.

The carrying module 300, the top support module 500, the primary wheel module 600, the support module 20 of the caring machine 2 can be independently installed on the main unit module 1 or combined in various configurations depending on the specific requirements of the intended usage scenario. The present invention provides flexibility for allowing the caring machine 2 to serve multiple purposes within a single unit. By adjusting the combinations of the main unit module 1 and these modular components, users can tailor the caring machine 2 to suit different needs. Moreover, these modular components are designed for quick disassembly and assembly, enhancing portability and ease of use.

Figure 13:
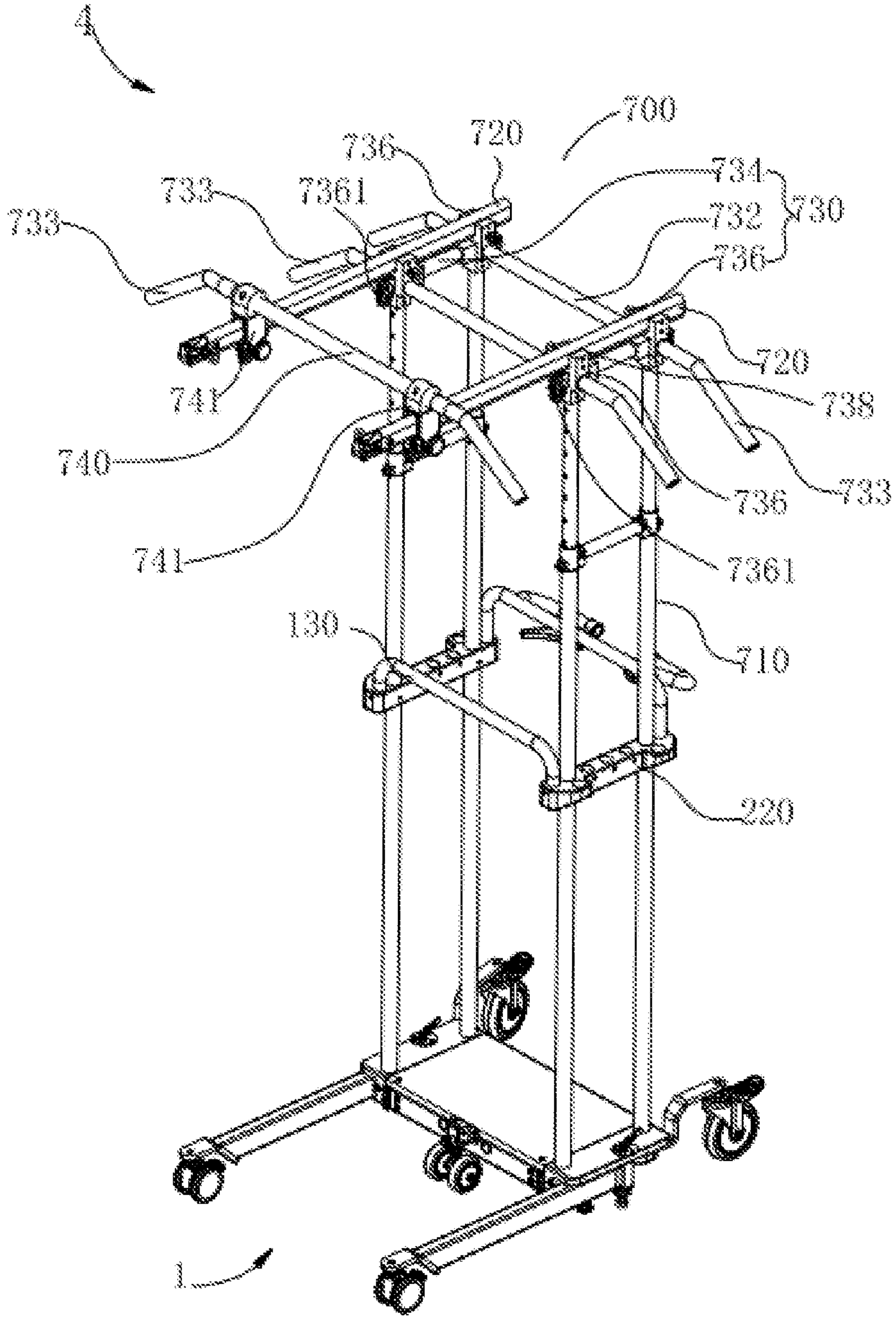
FIG. 13 is a perspective view of an embodiment of the overhanging machine according to the present invention.

Please refer to FIG. 13 in conjunction with FIG. 1 and FIG. 2. FIG. 13 depicts a perspective view of an embodiment of the overhanging machine of the present invention. To achieve various advantages, an embodiment of the present invention provides an overhanging machine 4 comprising the main unit module 1 and a shelf module 700. The shelf module 700 is positioned above the main unit module 1 to enable users to engage in diverse sports training activities, including rehabilitation exercises. The shelf module 700 comprises multiple support columns 710 and at least two overhanging arms 720.

A plurality of support columns 710 are vertically installed on the connecting plates 220 through the first mounting holes 222 and are secured with fasteners 226 through the second keyholes 224. Depending on the specific usage scenarios or functions, the support columns 710 can be affixed to different first mounting holes 222 on the connecting plate 220. That is, it allows for flexibility in adjusting the spacing between every two support columns 710 installed on the same connecting plate 220 based on varying usage requirements. One end of the two overhanging arms 720 is affixed to multiple support columns 710, the two overhanging arms 720 are positioned above the connecting plates 220.

Figure 14:
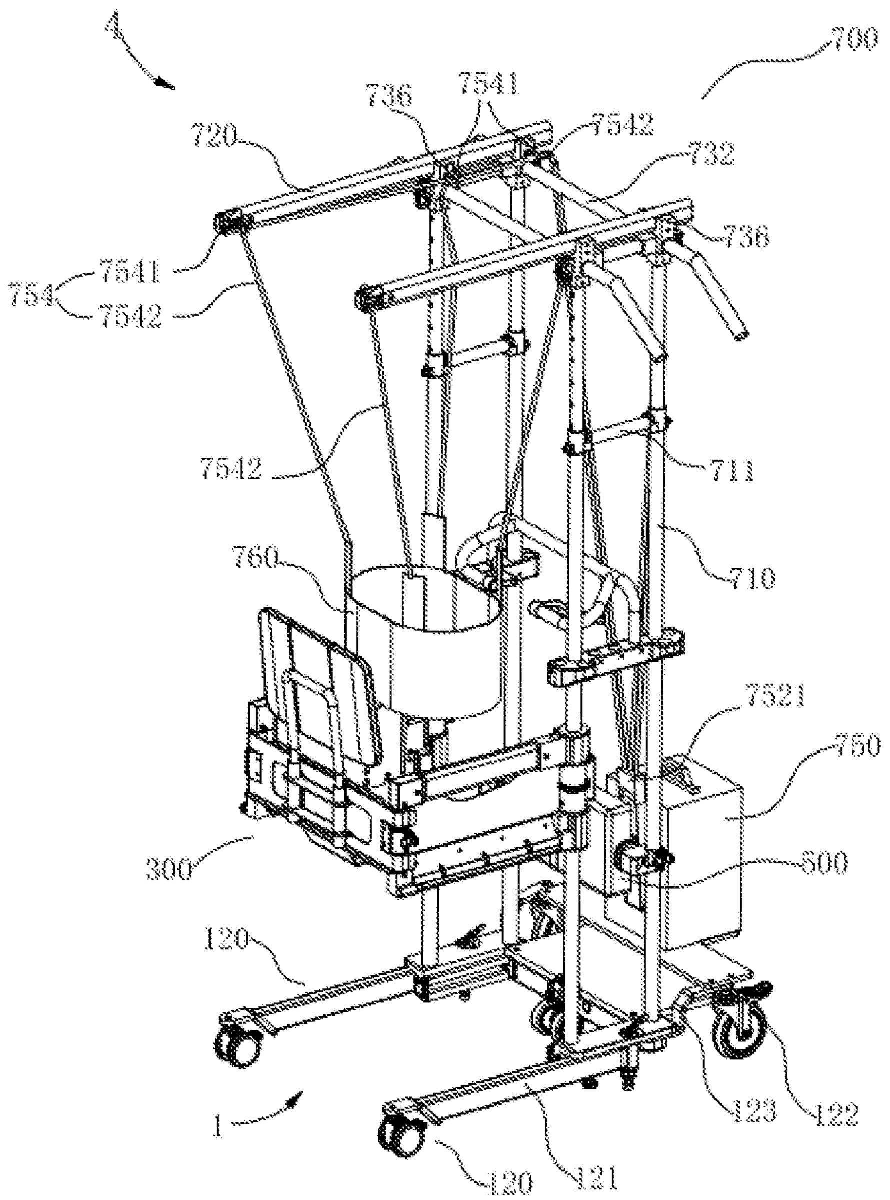
FIG. 14 is a perspective view of an embodiment of a sling machine in the overhanging machine as shown in FIG. 13.

The plurality of support columns 710 may consist of cylindrical tubes with a fixed length the same diameter, but this is not limited to this configuration. The support columns 710 can also be telescopic functionality, allowing for adjustment of the installation height of the two overhanging arms 720 in the vertical direction. Meanwhile, the support columns 710 with telescopic features are typically equipped with multiple mounting holes, enabling adjustment of their installation height by altering the locking positions of these mounting holes, thus adjusting the height of the overhanging arm 720 along the vertical direction. In such embodiment, as depicted in FIG. 14, a connecting rod 711 can be installed between two adjacent support columns 710 on the same connecting plate 220 to enhance the stability of the installation connection among multiple support columns 710 of the shelf module 700. At the end of the overhanging arm 720, away from the support column 710, a hook-shaped member is provided, facilitating the suspension or hanging of objects.

In a specific embodiment, the shelf module 700 may include a receiving frame 730 positioned on the upper ends of the plurality of support columns 710 so as to connect the two overhanging arms 720. Alternatively, the two overhanging arms 720 can be directly mounted onto the support columns 710 using other attachment fasteners.

The receiving frame 730 consists of at least two long rods 732, at least two short rods 734, and a plurality of locking support members 736. The number of locking support members 736 corresponds to the number of support columns 710, and each locking support member 736 is installed on top of a support column 710 (at the end opposite to the connecting plate 220). The two long rods 732 and two short rods 734 are connected and locked through the locking support members 736, then horizontally mounted on the tops of the support columns 710. Once locked, the long rod 732 and short rod 734 are perpendicular and situated in the same plane. The locking support member 736 provides a groove 738 located on its top surface. Once the long rods 732, short rods 734, and locking support members 736 are installed on the support column 710, one end of the overhanging arm 720 is threaded through and nestled into the groove 738 of the locking support 736 intended to receive it. Then, the locking support members 736 are secured to lock the overhanging arm 720 onto them, followed by connection to the top of the receiving frame 730. Upon locking, the overhanging arm 720 aligns parallel to the short rod 734 of the receiving frame 730, the overhanging arm 720 is positioned above the short rod 734. The arrangement of the receiving frame 730 bolsters the stability and support strength of the shelf module 700.

To enhance the versatility and practicality of the overhanging machine 4, the locking support member 736 of the receiving frame 730 may comprise a hook-shaped member 7361 capable of suspending or hanging objects. The hook-shaped member might take the form of a J-shaped hook or a shackle secured through threads. Additionally, handgrip rods 733 can be added to the two ends of the long rod 732 of the receiving frame 730, providing users with support points to grasp. For increased installation flexibility across various usage scenarios, the handgrip rod 733 can be detachably affixed to both ends of the long rod 732. In a typical scenario, users can stand on the chassis unit 110 of the shifting module 100 and grasp the handgrip rods 733 on the long rods 732 to engage in standing training or other bodily movement exercises.

The overhanging machine 4 can also comprise a second crossbar 740, horizontally supported by the two overhanging arms 720 and positioned at the end of the overhanging arms 720 opposite to the receiving frame 730 or the support column 710. In a specific embodiment, the two ends of the second crossbar 740 can be securely affixed to the two overhanging arms 720 using a locking component 741. This arrangement ensures that the second crossbar 740 remains fixed on the two overhanging arms 720 and is used to be a horizontal bar for users to engage in stretching exercises. For instance, an individual undergoing rehabilitation therapy could utilize the second crossbar 740 for upper limb or hand movement training. In one embodiment, handgrip rods 733 may be provided at both ends of the second crossbar 740, offering users additional points of support to grasp. For example, users could stand between the two long legs 121 of the wheel caster set 120 and hold onto the second crossbar 740 the handgrip rods 733 while performing standing training or other limb movement exercises.

One end of the locking member 741 provides a hook-shaped member, facilitating the hanging or suspension of objects. In practice, the attachment and locking position of the locking member 741 on the overhanging arm 720 can be adjusted along the arm's length to meet different exercise requirements. The adjustability allows users to customize the placement of the locking member 741 and, consequently, the position of the second crossbar 740. By moving it forwards or backwards, users can conveniently tailor the overhanging machine 4 for performing limb-focused rehabilitation exercises.

Figure 15:
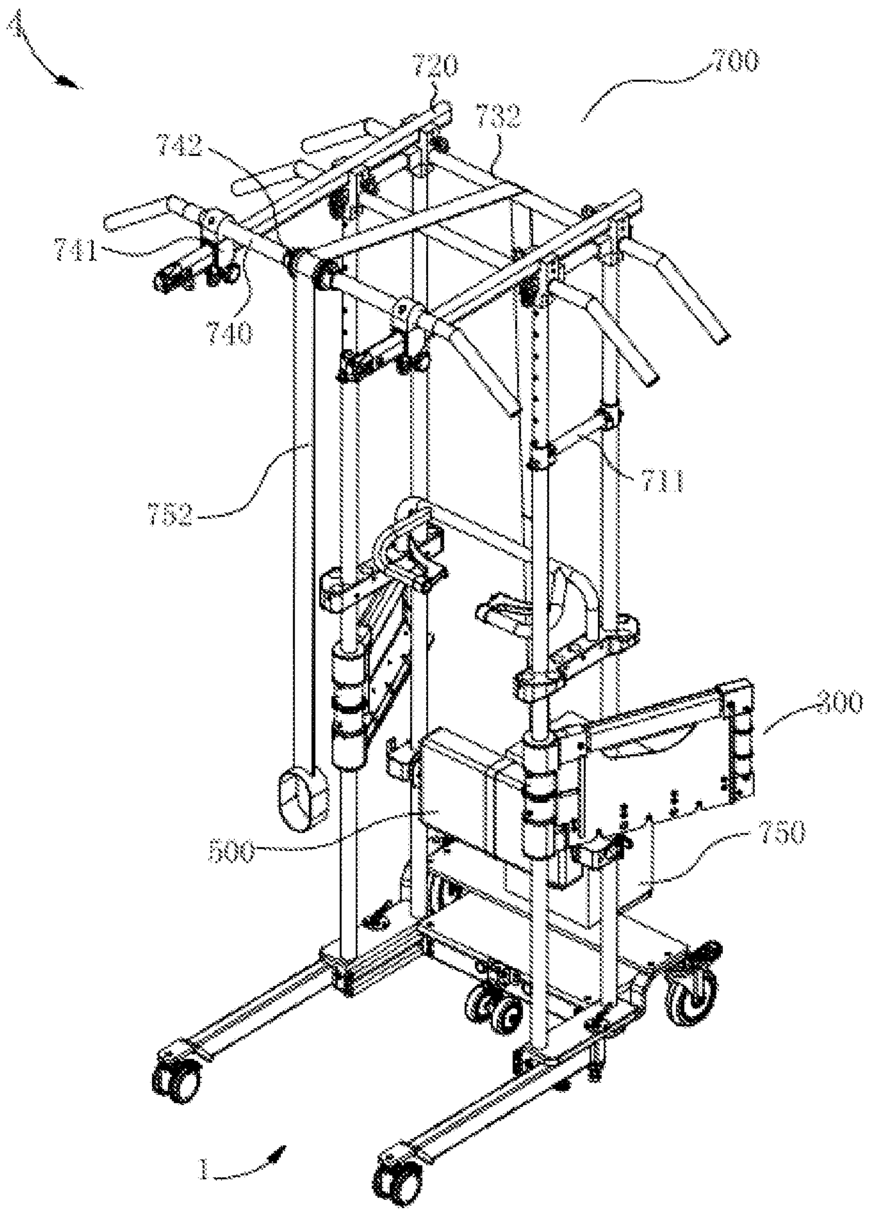
FIG. 15 is a perspective view of another embodiment of the sling machine in the overhanging machine as shown in FIG. 13.

Referring to FIGS. 14 and 15 in conjunction with FIG. 13, FIG. 14 depicts a perspective view of one implementation of the sling machine integrated into the overhanging machine shown in FIG. 13, while FIG. 15 illustrates another embodiment of the sling machine in the overhanging machine. In FIG. 14, the overhanging machine 4 further comprises a sling machine 750, which is mounted either on the chassis unit 110 of the supporting frame module 200 or the shifting module 100. Specifically, the short leg 123 of the wheel caster set 120 in the shifting module 100 is furnished with a carrying plate designed to accommodate the sling machine 750. The sling machine 750 comprises a retractable sling 752, which may consist of a single piece or multiple pieces. The retractable sling 752 is capable of being draped around the long rod 732 of the receiving frame 730 to suspend an object. Additionally, the overhanging machine 4 comprises a pull rope assembly 754, positioned along the two overhanging arms 720. The pull rope assembly 754 comprises numerous hook members 7541 affixed symmetrically to the two overhanging arms 720, along with multiple pull ropes 7542 threaded through these hook members 7541. One end of each pull rope 7542 is attached to the head end of the retractable sling 752 on the sling machine 750, while the other end is utilized to suspend an object. In a specific embodiment, a hook 7521 may be provided with the retractable sling 752 to ensure secure attachment of the pull ropes 7542. When the need arises to relocate a person with mobility challenges, a sling or suspension apparatus can be suspended from the ends of the pull ropes 7542, allowing the individual to sit comfortably. In such a suspension setup, the overhanging machine 4 facilitates the movement of the individual or the person under care.

Referring to FIG. 15 alongside FIG. 13, in one embodiment, a roller 742 may be disposed at the second crossbar 740. The roller 742 serves as a mounting point for the retractable sling 752. The retractable sling 752 from the sling machine 750 can be wound around the outer circumference of the roller 742 to suspend objects. Additionally, the retractable sling 752 may comprise a hook for improved object suspension, enhancing user convenience during movement or rehabilitation activities.

Figure 16:
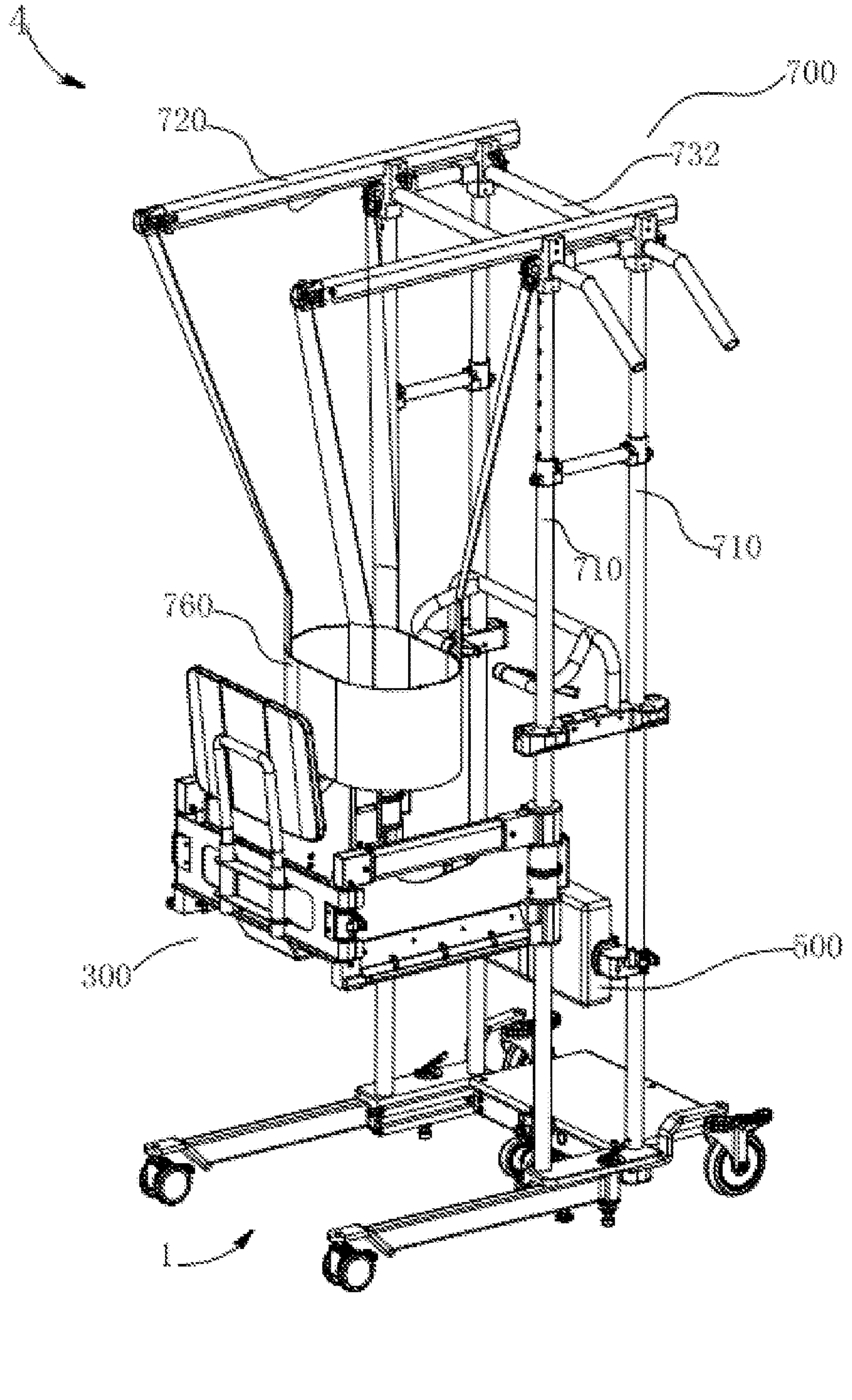
FIG. 16 is a perspective view of an embodiment of the shelf module in the overhanging machine shown in FIG. 13.

Referring to FIG. 16 alongside FIGS. 13 and 14, FIG. 16 illustrates an embodiment of the shelf module within the overhanging machine depicted in FIG. 13. Once the two overhanging arms 720 are securely installed, the ends of the two overhanging arms 720 that are situated away from the receiving frame 730 or the support column 710 can be utilized to suspend either a hanging cloth module 760 or a shelf module. The hanging cloth module 760 or a shelf module are used to serve various purposes such as supporting the user's body or facilitating movement during rehabilitation exercises. The hanging cloth module 760, for instance, can be suspended from the shelf module 700 utilizing the hook-shaped member of the overhanging arm 720 the hook-shaped member 7361 of the locking support member 736, as demonstrated in FIG. 14. Alternatively, in another embodiment depicted in FIG. 14, the hanging cloth module 760 can be suspended from the shelf module 700 via the retractable sling 752 the pull rope assembly 754 installed on the sling machine 750.

Please refer to FIGS. 14 to 16 alongside FIG. 2, FIG. 4, and FIGS. 6 to 8, the main unit module 1 of the overhanging machine 4 can accommodate various components such as the carrying module 300, the top support module 500, the support module 20. These modules, when combined with the shelf module 700, the second crossbar 740, the sling machine 750, the sling module 760, and other elements, provide a versatile range of functionalities. Through different configurations of the main unit module 1, the carrying module 300, the top support module 500, the support module 20, the overhanging machine 4 can fulfill multiple roles akin to the caring machine 2 in specific scenarios. This adaptability allows for cost-effectiveness and ease of use, as the modular components can be swiftly assembled or disassembled, facilitating portability and convenience.

The caring machine 2 further consists of an electric module 800, designed to provide additional functionalities. The electric module 800 is affixed onto a plurality of second mounting holes 115 disposed on the chassis unit 110, using fasteners 8112 for secure attachment. Comprising a mounting base frame 810, a column module 820, and a driving module 830, the electric module 800 provides versatility and adaptability. The mounting base frame 810 consists of a coupling base 811 and an adapter base 812, with the adapter base 812 capable of adjustable fixation to the coupling base 811. Through positioning rods 8111, the coupling base 811 securely connects to the second mounting hole 115, ensuring stable installation above the chassis unit 110, with fasteners 8112 securing it in place. The column module 820 comprises a fixed bracket 821 and a lifting bracket 822. The fixed bracket 821 is mounted on the adapter base 812 of the mounting base frame 810, while the lifting bracket 822 is positioned above the fixed bracket 821, enabling vertical movement. Multiple apertures along the vertical axis of the lifting bracket 822 allow for the installation of various health care modules at different heights, catering to diverse user needs. Additionally, the driving module 830 is installed on the adapter base 812 of the mounting base frame 810. It facilitates vertical movement of the lifting bracket 822, enabling seamless adjustment of the installed health care modules to suit user requirements.

Figure 17:
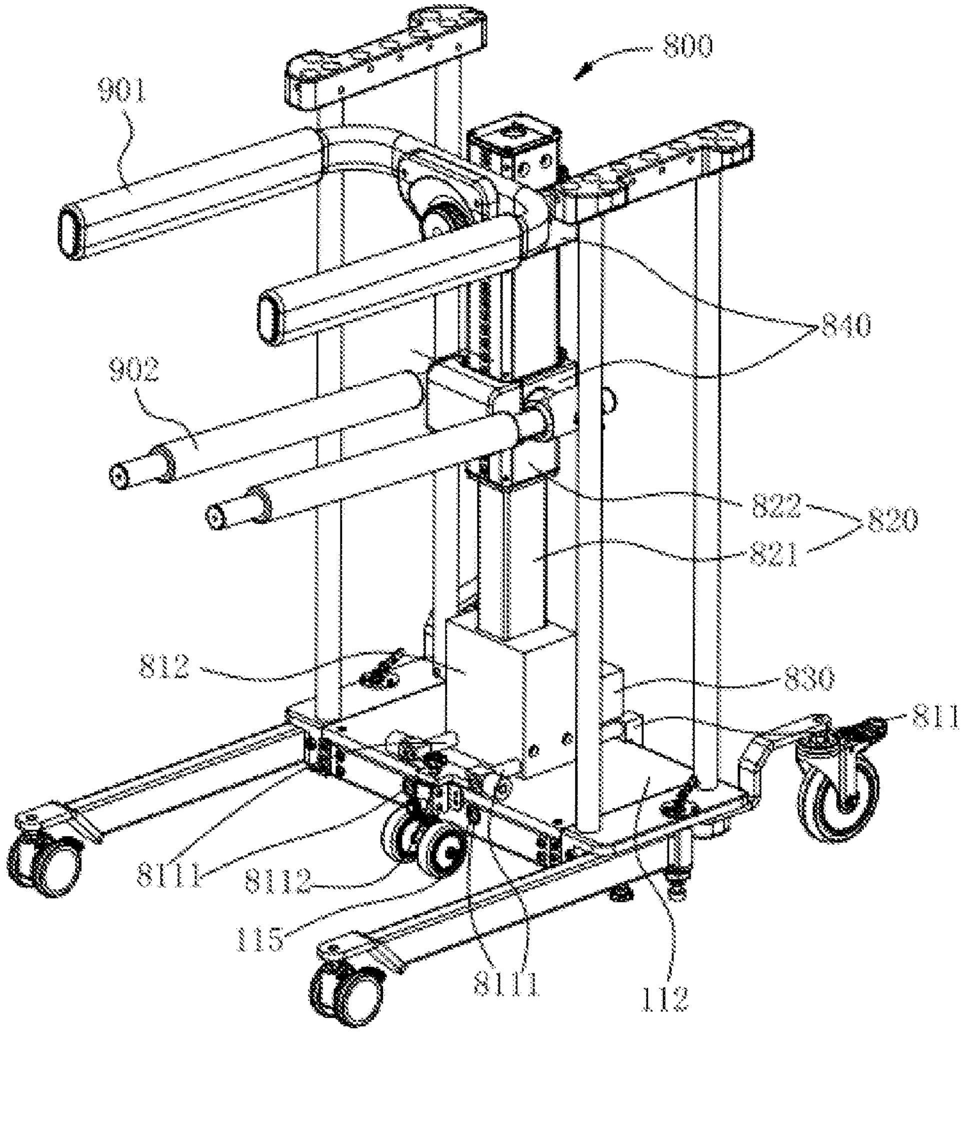
FIGS. 17 and 17A are perspective views of an electric module from different viewing angles according to the present invention.
Figure 17A:
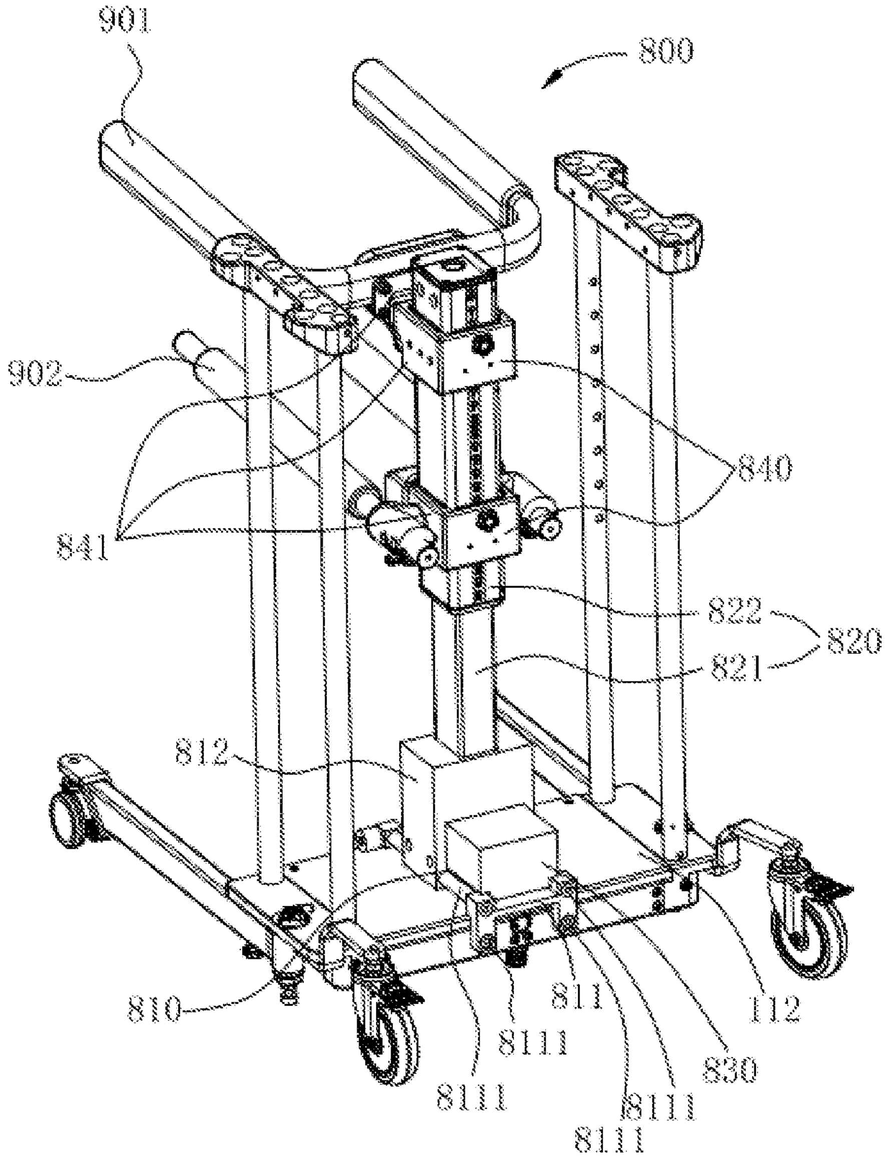

FIG. 17 and FIG. 17A depict perspective views of the electric module 800 from different angles, showcasing its features in accordance with the present invention. Within the electric module 800, a set of fastening devices 840 are coupled with the column module 820. The fastening devices 840 are securely fastened at any desired height along the lifting bracket 822 through the apertures. Each fastening device 840 is equipped with multiple fastening interfaces 841, designed for the installation of caring modules such as health care modules 901, 902, and so forth, as illustrated in the figures.

In summary, the present invention provides a versatile main unit module capable of accommodating various caring functionalities and facilitating user movement. It also enables the adjustment of installation heights for different health care modules, enhancing adaptability. The overhanging machine provided by the present invention is used to suspend and mobilize users, aiding in limb movement and supporting disabled individuals in limb rehabilitation. Moreover, the caring machine of the present invention delivers a range of health care functions tailored to users, including those with disabilities. It allows for the customization of health care functionalities based on specific needs, offering a single solution for multiple purposes. This eliminates the need for multiple types of care machines, ultimately reducing care-related expenses for users.

The descriptions illustrated above set forth simply the preferred embodiments of the present invention; however, the characteristics of the present invention are by no means restricted thereto. All changes, alterations, or modifications conveniently considered by those skilled in the art are deemed to be encompassed within the scope of the present invention set forth by the following claims.

What is claimed is:

1. A caring machine, capable of integrating various caring modules to offer a range of care functions, comprising a main unit module, a primary wheel module and a push module, wherein:

the main unit module comprises a shifting module, a supporting frame module, and a coupling module;

the shifting module comprises at least one chassis unit and a wheel caster set, wherein the wheel caster set is pivotally connected to two opposite sides of the chassis unit, the chassis unit comprises a flat upper surface suitable for a pedal; the chassis unit comprises a chassis body and a moving pedal, the chassis body is provided with a guide unit, the moving pedal is positioned on the chassis body, moving forward and securing at various locations through the guide unit; the wheel caster set comprises at least multiple universal wheel caster sets and a directional wheel caster set, the directional wheel caster set is mounted on side of the chassis unit and enclosed within a horizontal area formed by the vertices of the universal wheel caster sets, the directional wheel caster set comprises a directional wheel, an elastic device, and a switching device, wherein the continuous ground contact of the directional wheel through the action of the elastic device is maintained throughout the movement the switching device is used to controls the directional wheel's orientation so that the directional wheel is enabled to be fixed in a predefined direction or left in a freely rotatable state;

the supporting frame module comprises multiple upright poles and multiple connecting plates, wherein one end of the upright poles is attached and secured to the chassis unit of the shifting module, while the other end of the upright poles is connected and fixed below the multiple connecting plates; and the coupling module comprising a plurality of coupling devices and coupling interfaces positioned on the shifting module the supporting frame module for attaching and securing caring modules with diverse functionalities; the coupling module comprises multiple first keyholes and a height adjustment device, the first keyholes are arranged on the upright pole along the vertical direction, and the height adjustment device is slidably mounted on the upright pole and locked with the upright pole through the first keyholes; the coupling interfaces further comprise multiple first mounting holes, and multiple second mounting holes, the multiple first mounting holes are provided on the connecting plate the multiple second mounting holes are arranged on the chassis unit;

an electric module, positioned on the plurality of second mounting holes and securely fixed onto the chassis unit using fasteners, comprises a mounting base frame, a column module, a driving module, and a plurality of fastening devices;

the mounting base frame, installed above the upper surface of the chassis unit through the second mounting hole;

the column module, comprising a fixed bracket and a lifting bracket, with the fixed bracket securely installed on the mounting base frame, the lifting bracket positioned above the fixed bracket and capable of vertical movement, wherein multiple apertures are arranged vertically on the lifting bracket to facilitate the installation of the caring modules with different functions at adjustable heights;

the driving module, mounted on the mounting base frame and used to facilitate the vertical movement of the lifting bracket; and the plurality of fastening devices located on the column module and securely locked at various heights of the lifting bracket through the apertures, the fastening devices are provided with multiple fastening interfaces designed for the installation of the caring module;

the primary wheel module, installed on the main unit module, comprises two mounting brackets, two primary wheels, and two lifting devices;

the two mounting brackets, symmetrically installed on main unit module, comprising multiple primary wheel shaft hole devices for installing the two primary wheels;

the two lifting devices that are symmetrically installed on the mounting bracket or the wheel caster set, and each of the lifting devices comprises an overhead frame and a set of limiting pins, wherein the lifting device is used to elevate the wheel caster set connected to it, for installing or disassembling the primary wheel from the mounting bracket;

the push module is disposed at the supporting frame module of the main unit module for maneuvering the main unit module, and comprises a handrail which is installed on said plurality of connecting plates.

2. The caring machine according to claim 1, wherein the push module comprises a braking module, wherein the braking module comprises:

two braking devices, symmetrically installed on the shifting module of the chassis unit; and two braking handgrips, symmetrically installed on the handrail for controlling the braking devices.

3. The caring machine according to claim 2, wherein the caring machine further comprises a top support module that is mounted on the supporting frame module and comprises an attachment bracket and a seatback cushion, the seatback cushion is mounted on the attachment bracket to provide support for the user's torso.

4. The caring machine according to claim 2, wherein the caring machine further comprises a carrying module installed on the main unit module, wherein the carrying module comprises:

two attachment bases, sleeve-mounted on the supporting frame module of the main unit module;

two guardrails, respectively pivotally connected to the attachment bases for allowing rotation in the horizontal direction around the attachment bases; and two load-bearing plates, detachably and rotatably installed at the bottom of the two guardrails respectively, wherein when the load-bearing plates are positioned horizontally, the load-bearing plates can be used to carry weight;

the attachment bases are installed at the coupling device, each of the guardrails comprises a pivot device and a pivot hole, wherein the pivot hole for being fitted onto the attachment base and the pivot device is disposed at one end of the guardrail, and a self-locking positioning device installed at the attachment bases the guardrails, wherein when self-locking positioning device is positioned in a specific orientation, thereby constraining the horizontal rotation of the guardrails.

5. The caring machine according to claim 4, wherein each guardrail comprises a rotating rod that is installed on the bottom of the guardrail, the rotating rod is provided with a plurality of limiting pins, each load-bearing plate is provided with a pivot groove and is sleeved on the rotating rod, wherein the pivot groove is provided with a plurality of elongated holes for mounting the limit pins so that the load-bearing plate is placed horizontally to carry the load and is lifted upward to get close to the guardrail, and each load-bearing plate is designed with an arc-shaped notch, when the two load-bearing plates are laid flat and closed, the two arc-shaped notches face each other to create an opening.

6. The caring machine according to claim 5, wherein the carrying module further comprises a backrest assembly, the guardrails pivotally connected and fixed to one end of the attachment base is provided a pivoting locking device for connecting and locking the backrest assembly;

each of the pivot locking devices comprises a pivot sleeve and a hook locking member, the pivot sleeve is pivotally installed on the guardrail and comprises a positioning groove, the hook locking member is installed on one side of the backrest assembly that comprises a backrest seat and a backrest, the backrest seat comprises multiple hook locking members that securely connects and locks with the positioning groove of the pivot pipe sleeve respectively so as to maintain uniformity of the two guardrails in their vertical and horizontal orientations, and when only one side of the hook locking member of the backrest seat engages with the pivot sleeve, the backrest seat the pivot sleeve rotate at any angle.

7. The caring machine according to claim 4, wherein the caring machine further comprises a support module mounted on the main unit module, the support module comprises:

at least two receiving rods, respectively disposed at the supporting frame module;

two supporting devices, respectively mounted on the two receiving rods, and each of the supporting devices comprising an attachment bracket set, a support member, and a support pad, wherein the attachment bracket set is securely encased on the receiving rod, while the supporting member the support pad are adjustably attached to the attachment bracket set;

the support module further comprises a braking handle respectively arranged on the attachment bracket set for controlling the movement of the caring machine, the attachment bracket set comprises a sleeve member, a mounting bracket, a mounting plate, and a plurality of locking members, wherein the sleeve member is slidably encased and secured on the receiving rod, the mounting bracket is flexibly mounted within the sleeve member, the mounting plate is positioned on the mounting bracket to accommodate the support pad, the multiple locking members are installed at the mounting bracket;

the support module further comprises a supporting assembly that comprises a supporting device and multiple adjustable rods arranged in a generally U-shaped, and two ends of the supporting device are respectively installed on two attachment bracket sets, and are positioned above the supporting devices.

8. The caring machine according to claim 1, wherein the primary wheel module further comprises a first crossbar and an electric driving wheel, the crossbar is detachably affixed at both ends to the two mounting brackets, the electric driving wheel is positioned at the center of the first crossbar for driving the movement of the main unit module.

9. An overhanging machine, comprising the caring machine of claim 2, wherein the overhanging machine further comprises a shelf module installed and positioned above the main unit module, the shelf module comprises:

multiple support columns, vertically installed on the connecting plate through the first mounting holes; and at least two overhanging arms, mounted on the support columns and positioned above the connecting plate, wherein one end of the overhanging arm is equipped with a hook-shaped member for hanging objects.

10. The overhanging machine of claim 9, wherein the shelf module further comprises a receiving frame that is positioned on the upper ends of the support columns to connect the two overhanging arms and comprises at least two long rods, at least two short rods, and multiple locking support members, wherein the two long rods and two short rods are interconnected and secured through the locking support members and horizontally positioned on the top or upper ends of the support columns, one side of the locking support member is provided with a hook-shaped member for hanging objects, the receiving frame further comprises at least two holding rods detachably connected to both ends of the long rod.

11. The overhanging machine of claim 10, wherein the overhanging machine further comprises a sling machine that is positioned on the main unit module and comprises a retractable sling that is suspended from the shelf module for suspending objects, the overhanging machine further comprises a second crossbar that is horizontally supported on the two overhanging arms, and a roller is affixed to second crossbar for hanging the sling.

12. The overhanging machine of claim 11, wherein the overhanging machine further comprises a pull rope assembly that is disposed on two overhanging arms and comprises a plurality of hook members and a plurality of pull ropes, wherein the hook members are symmetrically locked on two overhanging arms, the pull ropes are threaded through the hook members, and one ends of the hook members are hooked to the head end of the sling of the sling machine, the other ends of the hook members are used to overhang an object.

* * * * *